(12) United States Patent
Kitagawa

(10) Patent No.: US 6,707,271 B2
(45) Date of Patent: Mar. 16, 2004

(54) POWER SUPPLY APPARATUS WITH CHARGEABLE BATTERY AND CHARGE/DISCHARGE METHOD

(75) Inventor: Seiya Kitagawa, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/192,542

(22) Filed: Jul. 11, 2002

(65) Prior Publication Data

US 2002/0171399 A1 Nov. 21, 2002

Related U.S. Application Data

(62) Division of application No. 09/761,754, filed on Jan. 18, 2001, which is a division of application No. 09/139,025, filed on Aug. 24, 1998, now Pat. No. 6,204,633.

(30) Foreign Application Priority Data

Feb. 20, 1998 (JP) .............................................. 10-38672

(51) Int. Cl.⁷ ................................................. H02J 7/00
(52) U.S. Cl. ..................................................... 320/134
(58) Field of Search ................................. 320/124, 118, 320/127, 135, 136

(56) References Cited

U.S. PATENT DOCUMENTS

| | | | |
|---|---|---|---|
| 4,502,000 A | 2/1985 | Mashikian | 320/122 |
| 4,849,682 A | 7/1989 | Bauer et al. | 320/106 |
| 5,477,123 A | 12/1995 | Allen et al. | 307/48 |
| 5,504,413 A | 4/1996 | Fernandez et al. | 320/163 |
| 5,666,006 A | 9/1997 | Townsley | 307/43 |
| 5,710,503 A | 1/1998 | Sideris et al. | 324/431 |
| 5,729,117 A | 3/1998 | Fukuda | 320/117 |
| 5,760,570 A | 6/1998 | Nagai et al. | 320/162 |
| 5,811,959 A | 9/1998 | Kejha | 320/126 |
| 5,903,764 A | 5/1999 | Shyr et al. | 395/750.01 |
| 5,955,867 A | 9/1999 | Cummings et al. | 320/107 |
| 6,356,055 B1 | 3/2002 | Lin et al. | 320/116 |

FOREIGN PATENT DOCUMENTS

| | | |
|---|---|---|
| GB | 2 313 721 | 12/1997 |
| JP | 9-322431 | 12/1997 |

Primary Examiner—Gregory J. Toatley, Jr.
(74) Attorney, Agent, or Firm—Westerman, Hattori, Daniels & Adrian, LLP

(57) ABSTRACT

The present invention provides a battery charging/discharging method for effectively using the battery energy of a power supply apparatus with a plurality of chargeable batteries. The power supply apparatus in which batteries are connected in parallel to the node of an external power source and a load comprises a charge/discharge monitor unit for judging whether the external power source is in a state where a load is driven and sufficient voltage to charge the batteries is outputted or in a state where sufficient voltage is not outputted and a discharge current should be supplied from the batteries to the load, switches inserted in series with each of the batteries, and an on/off control unit for controlling the on/off operation of the switches according to the output of the charge/discharge monitor unit and the charging/discharging state of each battery.

12 Claims, 41 Drawing Sheets

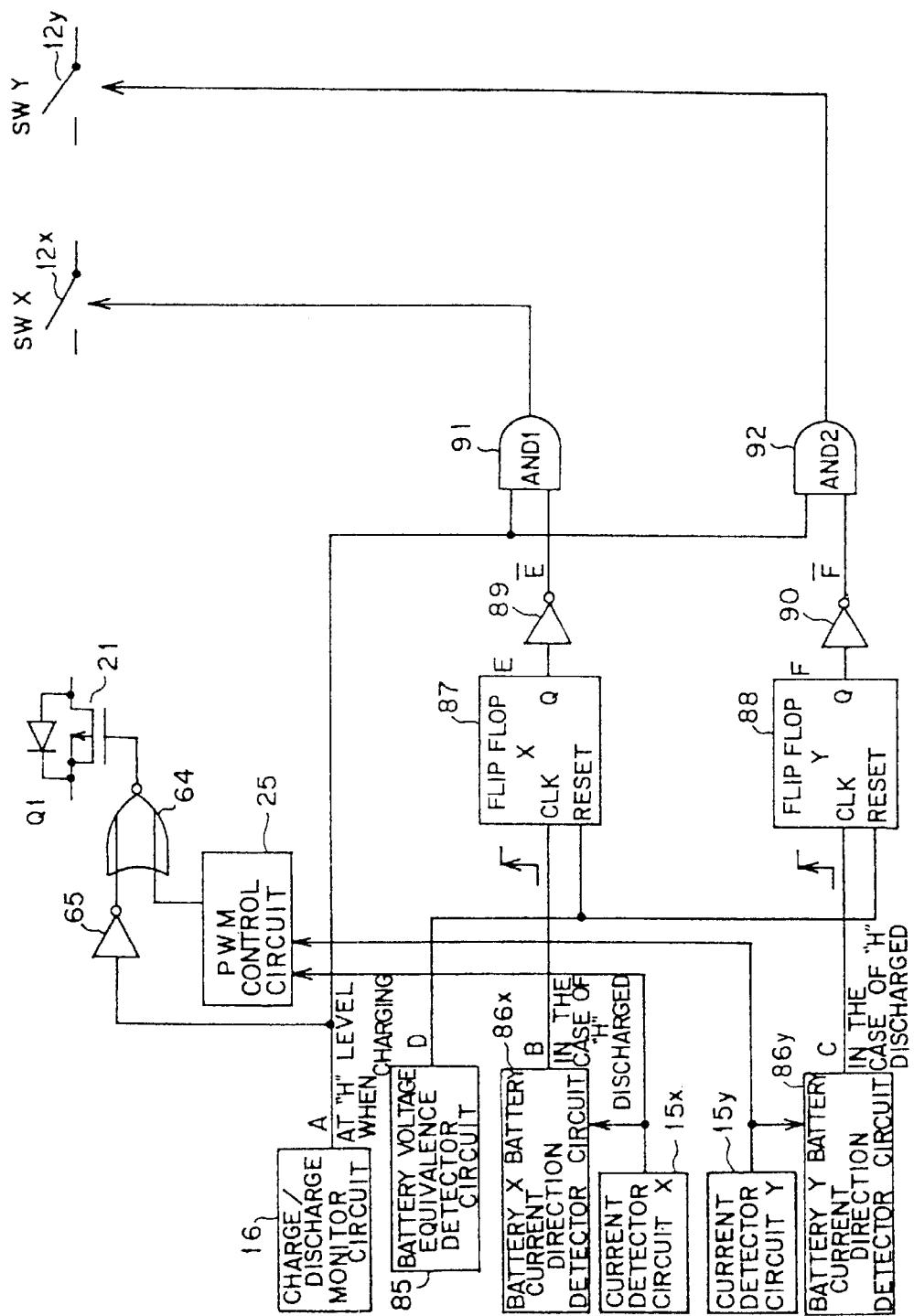
F I G. 18

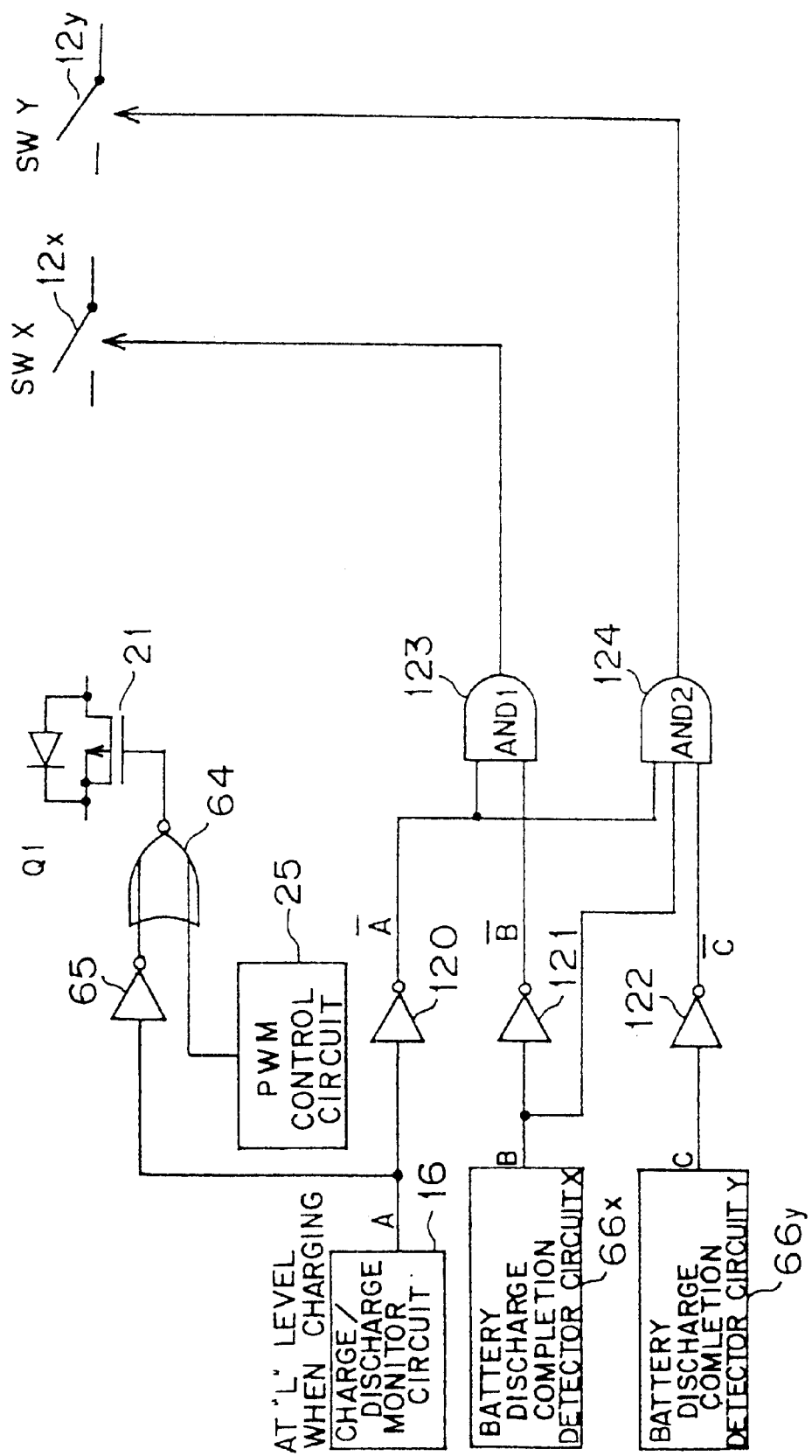
F I G. 24

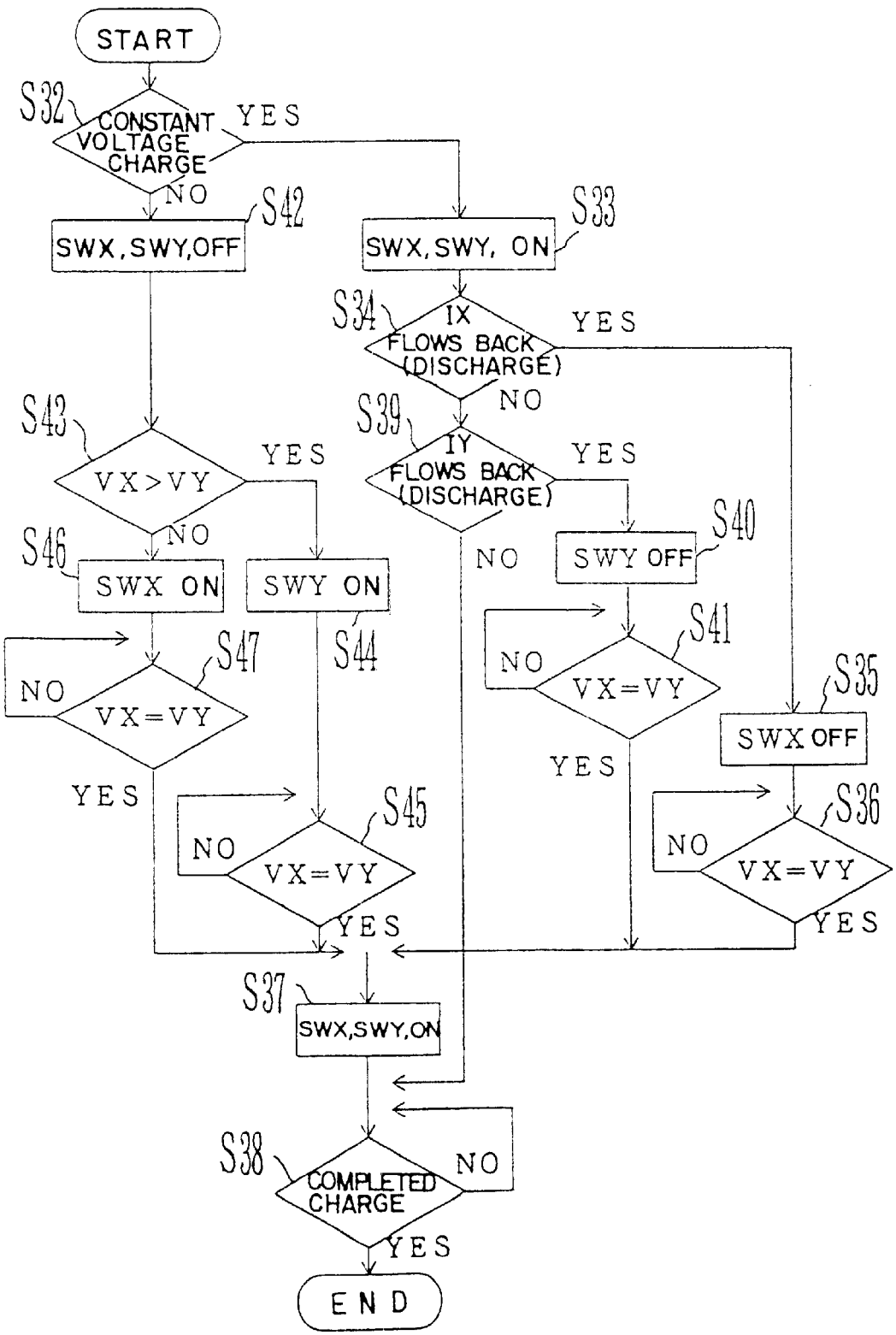
F I G. 37

POWER SUPPLY APPARATUS WITH CHARGEABLE BATTERY AND CHARGE/DISCHARGE METHOD

This application is a divisional of prior application Ser. No. 09/761,754 filed Jan. 18, 2001, which is a divisional application of Ser. No. 09/139,025 filed on Aug. 24, 1998 now U.S. Pat. No. 6,204,633.

BACKGROUND OF THE INVENTION

1. Field of the Invention

The present invention relates to a power supply apparatus using chargeable batteries. Portable devices such as a notebook personal computer, etc. can usually be operated by both AC mains and a battery. When the portable devices are operated by the AC mains, an AC adapter is used. The AC adaptor is designed so as to charge the batteries while also supplying a load with power. The present invention relates to a power supply apparatus for such a device installed with a plurality of chargeable batteries.

2. Description of the Related Art

FIG. 1 shows the configuration of a conventional power supply apparatus with chargeable batteries. The operation of this conventional power supply apparatus is described in detail in the following prior application.

Laid-open Patent Publication No. 8-137814 (9-322431)

Inventor: Seiya Kitagawa

Title of the Invention: Power supply apparatus

In FIG. 1, an AC adaptor is connected to the external power source terminal, power supplied from the AC adaptor drives a load 10 through a diode 9, and also charges a battery 14 through a DC—DC converter 11 for charging. When the AC adaptor is not connected or the voltage drops to an abnormally low level, the potential of the cathode side of the diode 9 falls, this fall of potential is detected by a charge/discharge monitor circuit 16, and the PWM (Pulse With Modulation) control circuit 25 inside the DC—DC converter 11 is controlled by the amount of potential drop. Thus, a FET 21 is always kept on, and the discharge current of the battery 14 is supplied to the load 10 through the DC—DC converter 11.

The DC—DC converter 11 is mainly used to regulate the voltage between the AC adaptor and the battery 14. The DC—DC converter 11 controls the charge to the battery 14 by switching on/off the FET 21 according to the control of a voltage error amplifier, a current error amplifier and a PWM comparator inside the PWM control circuit 25. For the details of these operations, see the above-mentioned prior application.

In the conventional example shown in FIG. 1, since only one chargeable battery 14 (a single package) can be used, there was a problem that the operation hours of a device driven by the battery cannot be extended by connecting a plurality of chargeable batteries in parallel. This is because when there is an imbalance in the charge states of batteries connected in parallel, energy flows from charged batteries to less-charged batteries, and such a charging overcurrent which occurs in this situation may damage the batteries.

SUMMARY OF THE INVENTION

It is an object of the present invention to provide a power supply apparatus such that the energy of the batteries may be effectively used, even if a plurality of chargeable batteries are connected in parallel, and a charge/discharge method of the batteries.

One embodiment of the present invention comprises a charge/discharge monitor unit for judging whether or not the power supply apparatus with a plurality of chargeable batteries connected in parallel between a node of an external power source and a load, and a common ground of the external power source and the load, is in a charge state when the external power source outputs voltage sufficient to drive a load and to charge the batteries, or is in a discharge state where the external power source does not output sufficient voltage and a current is discharged from the chargeable batteries to the load; switches inserted between each of the plurality of batteries, and an ON/OFF control unit for controlling the on/off operation of the switches according to the output of the charge/discharge monitor unit and the charge/discharge state of each of the plurality of batteries.

By controlling the switches for controlling the charge or discharge current of each battery, the ON/OFF control unit prevents a current from flowing back from charged batteries to less-charged batteries, if there is an imbalance in the charge states of the batteries.

Another embodiment further comprises a voltage equivalence detector unit for detecting the equivalence of battery voltages between chargeable batteries, and a battery current direction judgement unit for judging whether a current in each battery flows in a charge direction or discharge direction.

When the charge/discharge monitor unit detects a charge state, for example, out of two batteries, one battery in which current is judged to flow in a charge direction is charged by switching on/off switches inserted in series and corresponding to the other battery in which current is judged to flow in a discharge direction, by the battery current direction judgement unit. When a voltage equivalence is detected between one battery during charging and the other battery by the voltage equivalence detector circuit, the charge of the other battery is then controlled by the ON/OFF control unit.

Another embodiment further comprises a discharge completion detector unit for detecting the discharge completion state of each chargeable battery, and a battery current direction detection unit for detecting whether a current in each battery flows in a charge direction or discharge direction.

When the charge/discharge monitor unit detects a shift in status from a charge state to a discharge state, for example, out of two batteries, one battery in which a current is judged to flow in a charge direction is charged by switching on/off switches inserted in series and corresponding to the other battery in which a current is judged to flow in a discharge direction, by the battery current direction detection unit. When the discharge time reaches a predetermined value, a control is performed to repeat the processes of the current direction detection and after by the battery current direction detector unit.

For the charge method of the plurality of chargeable batteries of the present invention, for example, the following methods are used in a power supply apparatus with a DC—DC (direct current-direct current) converter between the node of an external power source terminal and a load, and the node in parallel with a plurality of batteries for being PWM-controlled when the batteries are charged with a current, and composing a directly-connected discharge route when a current is discharged from a battery to a load.

When the DC—DC converter is constant-voltage-controlled so that an output voltage may become constant, for example, out of two batteries, only one battery in which a current flows in a charge direction when charging is started is charged, and when the voltage of the battery during charging and the voltage of the other battery during not charging become equal, a control is performed so that the battery not charged may be charged.

When the DC—DC converter is constant-current-controlled so that an output current is constant, for example, out of two batteries, one battery with a lower voltage is first charged, and when the voltage of the battery during charging and the voltage of the other battery during not charging become equal, a control is performed so that the battery not charged may also be charged.

For the discharge method of the plurality of chargeable batteries of the present invention, when the status of the power supply apparatus shifts from a battery charging state to a battery discharging state, for example, a control is performed so that out of two batteries, one battery during charging may be first discharged, and after the apparatus detects the completion of the discharging, the other battery is discharged.

As described above, according to the present invention, in a power supply apparatus where a plurality of chargeable batteries are connected in parallel, switches are switched on/off so that the charged energy of the batteries may be effectively used.

BRIEF DESCRIPTION OF THE DRAWINGS

The present invention will be more apparent from the following description, when taken in conjunction with the accompanying drawings, in which;

FIG. 18 shows the third embodiment of the ON/OFF control circuit of the present invention.

FIG. 24 shows the sixth embodiment of the ON/OFF control circuit of the present invention.

FIG. 37 is a flowchart showing a process corresponding to the ON/OFF control circuit of the fifth embodiment.

DESCRIPTION OF THE PREFERRED EMBODIMENTS

Figure 1:
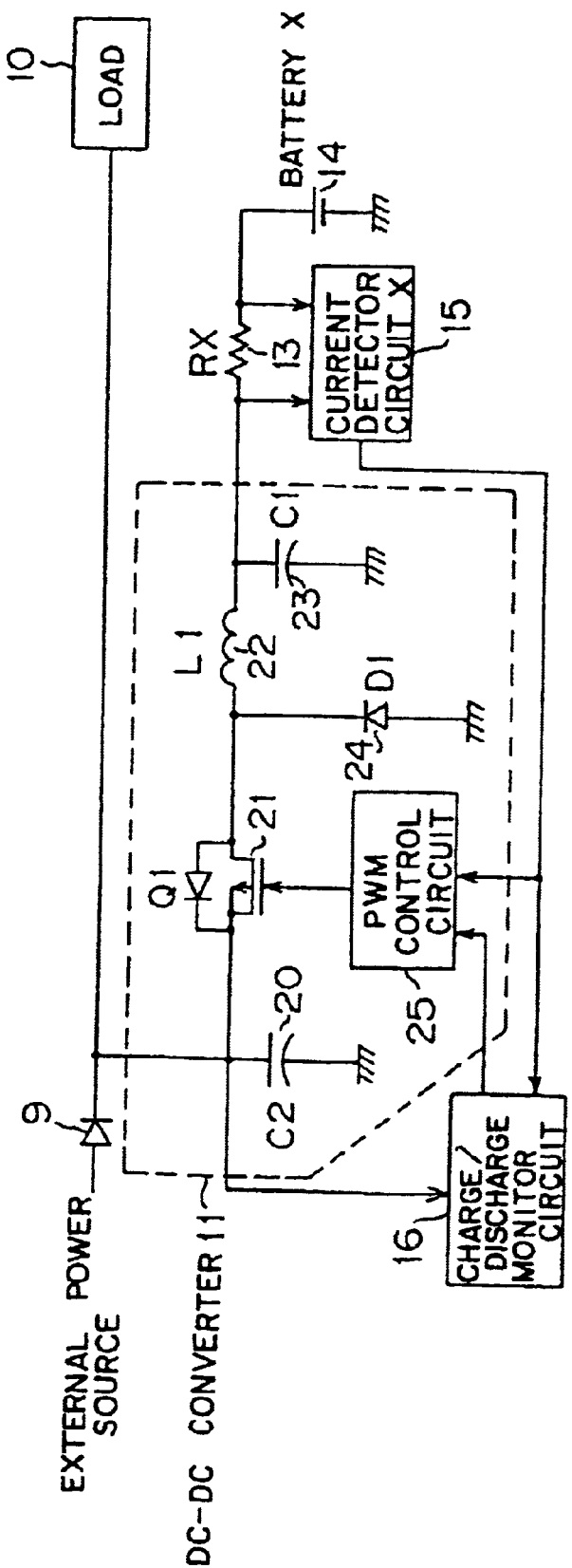
FIG. 1 shows the configuration of a conventional power supply apparatus with a chargeable battery.
Figure 2:
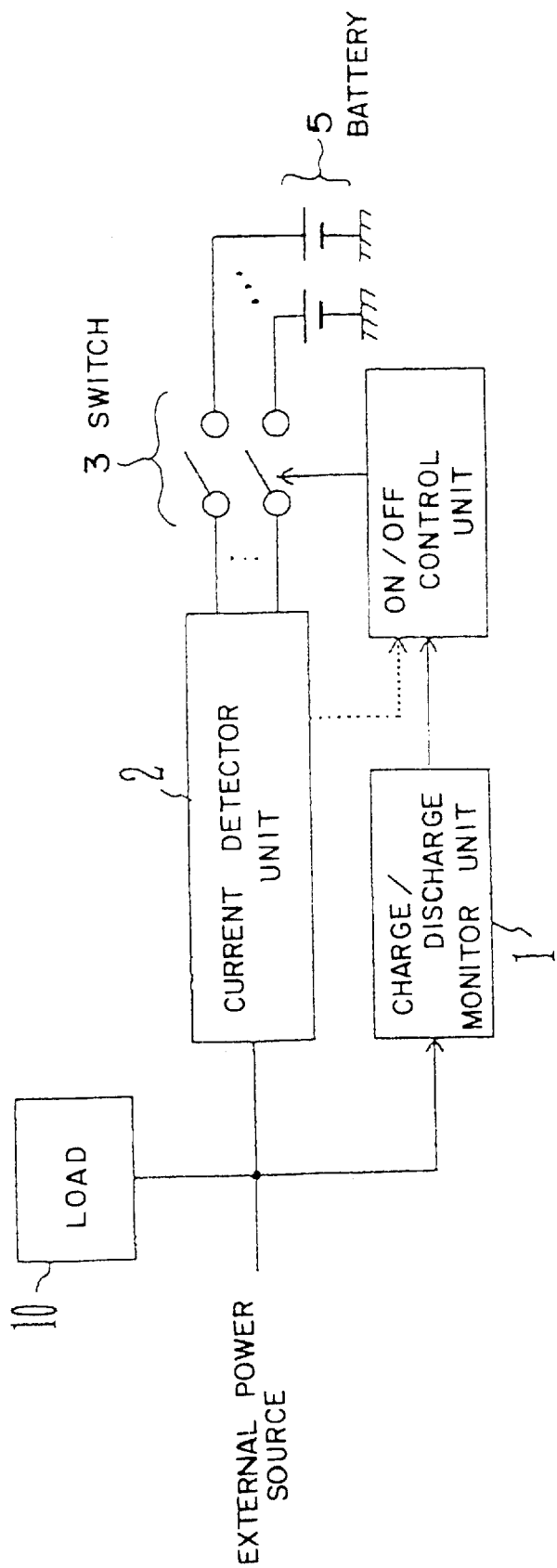
FIG. 2 shows the principle configuration of the present invention.

FIG. 2 shows the principle configuration of the present invention. The diagram is the principle configuration of a power supply apparatus in the case where a plurality of chargeable batteries 5 are connected in parallel between the node of an external power source, for example, an AC adaptor and a load 10, and a common ground.

In FIG. 2, a charge/discharge monitor unit 1 judges whether this power supply apparatus is in a charging state where an external power source drives a load and outputs a voltage sufficient to charge batteries, or in a discharging state where the external power source does not output a voltage sufficient to charge, and a current should be discharged from the chargeable batteries.

The current detector unit 2 detects the current flowing in each of a plurality of batteries 5. Although the current detector unit 2 is not needed in all the embodiments of the present inventions described later, the current detector unit 2 is shown in FIG. 2, since the current detector unit 2 is needed in many of the embodiments.

Switches 3 are inserted in series in each of the plurality of batteries 5. When one of the switches 3 is switched on, a current route is established, and a charging or discharging current flows through a corresponding battery 5 connected to the switch 3. Meanwhile, when the switch 3 is switched off, the current route is disconnected, and the charging or discharging current is stopped.

The ON/OFF control unit 4 controls the on/off state of the switches 3 according to the charge/discharge state of each of the plurality of batteries 5.

Figure 3:
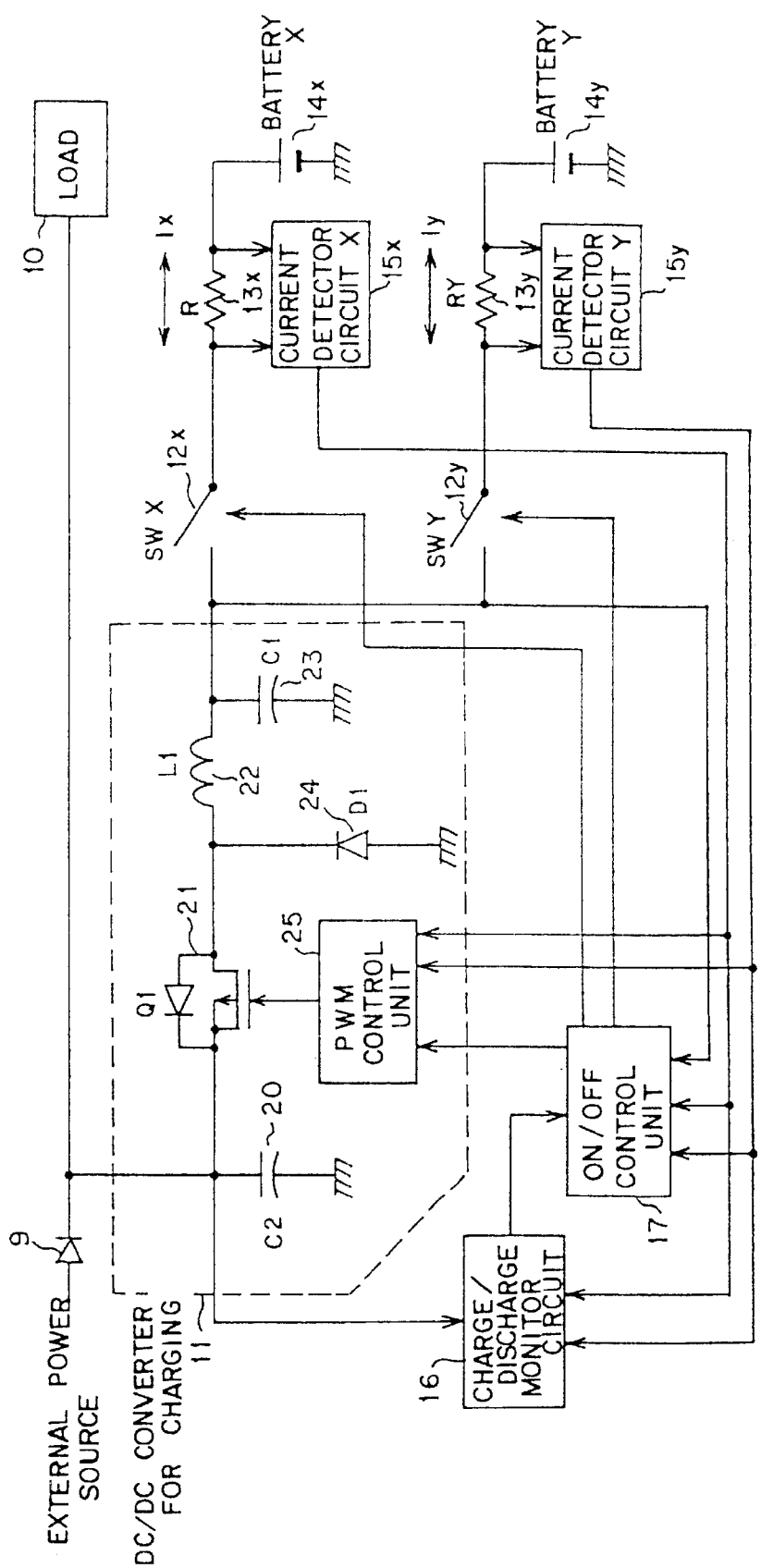
FIG. 3 shows the basic configuration of the power supply apparatus of the present invention.

FIG. 3 shows the basic configuration of the power supply apparatus of the present invention. The power supply apparatus shown in FIG. 3 comprises a DC—DC converter 11 for charging, connected between a diode 9 and a load 10, two switches 12x and 12y connected in parallel with the output side of the DC—DC converter 11, two resistors for current detection 13x and 13y connected in series between a corresponding switch and ground, two chargeable batteries 14x and 14y, two current detector circuits 15x and 15y for detecting the charge/discharge current of each battery, a charge/discharge monitor circuit 16, and an ON/OFF control circuit 17 for performing a characteristic operation in the present invention.

The DC—DC converter for charging comprises a capacitor 20 for eliminating the ripple on a voltage supplied from a power source connected to an external power source terminal, for example, an AC adaptor through a diode 9, and a FET 21 switched on/off when two batteries 14x and 14y are to be charged to control charging current, and is always on when these batteries are discharged, a smoothing reactance 22, a smoothing capacitor 23, a fly-wheel diode 24, and a PWM control circuit 25 for controlling the on/off of the FET 21 when the batteries 14x and 14y are to be charged. In FIG. 3, although all connections needed in the embodiments described later are shown, all the connections are not necessarily needed in all the embodiments.

In the present invention, although the on/off operation of both switches 12x and 12y is controlled according to a charge/discharge state of the batteries 14x and 14y, the control is performed by the ON/OFF control circuit 17. Therefore, the embodiment of the ON/OFF control circuit 17 is the main content of the present invention. Prior to the description of the embodiment of the ON/OFF control circuit 17, partial circuits needed to describe the embodiment of the ON/OFF control circuit 17 are described below with reference to FIGS. 4 through 13.

Figure 4B:
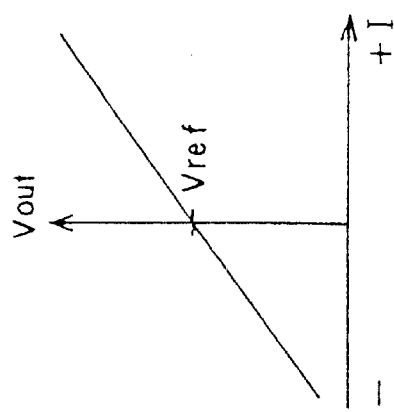
FIG. 4B is a graph showing the relationship between a detected current and an output voltage in a current detector unit.
Figure 4A:
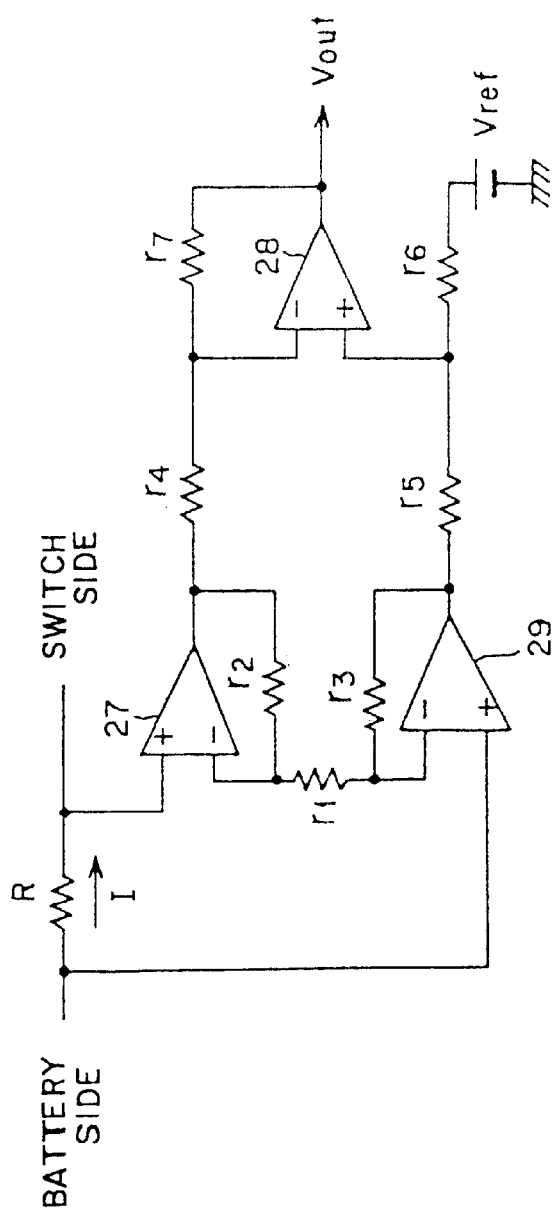
FIG. 4A shows a configuration example of a current detector circuit.

FIG. 4 explains a configuration example of the two current detector circuits 15 shown in FIG. 3. In FIG. 4A, the current detector circuit 15 comprises three operation amplifiers 27 through 29 and seven resistors $r_1$ through $r_7$. This circuit is a so-called instrumentation amplifier, in which $r_2=r_3$, $r_4=r_5$ and $r_6=r_7$.

In FIG. 4A, when a current flowing in a resistor R for current detection is assumed to be I, the output voltage of the instrumentation amplifier $V_{out}$ can be given by the following expression;

$$V_{out}=(r_7/r_4)\{(1+2r_2/r_1)RI\}+V_{ref}$$

where $r_2=r_3$, $r_4=r_5$ and $r_6=r_7$.

In FIG. 4A, the positions of the battery side and switch side are the reverse of the positions shown in FIG. 3, and the positive direction of a current I is the discharge direction of the battery current.

According to the above expression, as shown in FIG. 4B, it is found that if the output voltage $V_{out}$ of the instrumentation amplifier, that is, the current detector circuit, is greater than a reference voltage $V_{ref}$, the current I flowing in the resistor R for current detection is a discharging current, and if the output voltage $V_{out}$ of the current detector circuit is less than a reference voltage $V_{ref}$, the current I flowing in the resistor R for current detection is a charging current.

Figure 5:
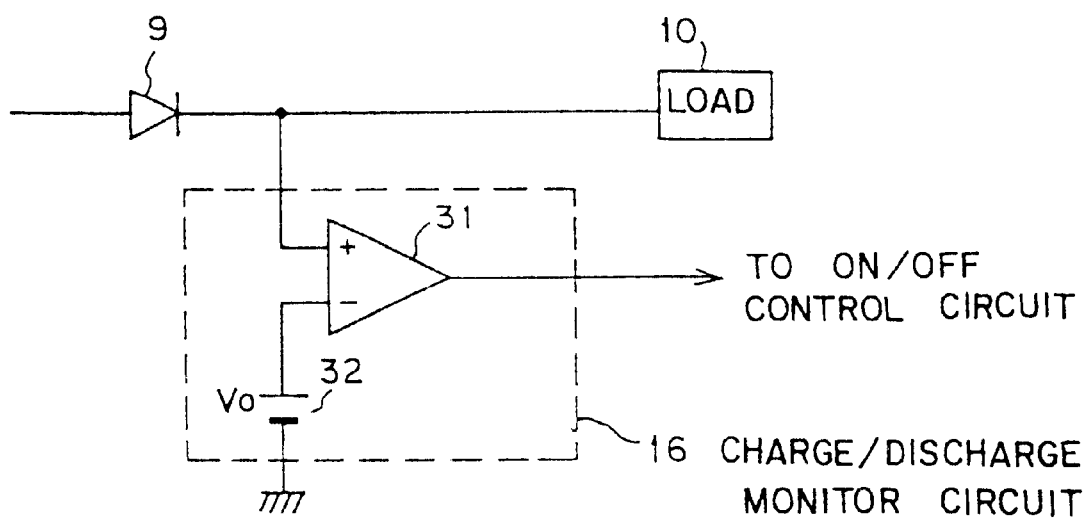
FIG. 5 shows a configuration example of a charge/discharge monitor circuit.

FIG. 5 shows the configuration of a charge/discharge monitor circuit 16 shown in FIG. 3. In the diagram the charge/discharge monitor circuit 16 comprises a comparator 31 for outputting an H (high level) when an input voltage to the DC—DC converter for charging 11 shown in FIG. 3, that is, the voltage on the cathode side of the diode 9, and the voltage $V_0$ of a reference voltage source 32, are inputted, and the voltage on the cathode side of the diode 9 is greater than the voltage $V_0$. According to the present invention the two batteries 14x and 14y are judged to be in a charging state, if an AC adaptor as an external power source is connected to the anode side of the diode 9 in FIG. 3 and power is supplied from the AC adaptor to a load 10, while both batteries 14x and 14y are judged to be in a discharging state, if an AC adaptor is disconnected and power is supplied from both batteries 14x and 14y to the load 10.

Since if the AC adaptor is disconnected, the voltage on the cathode side of the diode 9 becomes lower compared with when the AC adaptor is connected, an L (low level) for indicating a discharging state is outputted from the comparator 31, if the voltage on the cathode side of the diode 9 becomes lower than the voltage $V_0$ of the reference voltage source 32 in FIG. 5. The $V_0$ of this reference voltage source 32 is set, for example, to a level lower than the voltage on the cathode side of the diode 9 when the AC adaptor is connected, and to a level higher than the voltages of the batteries 14x and 14y.

Figure 6:
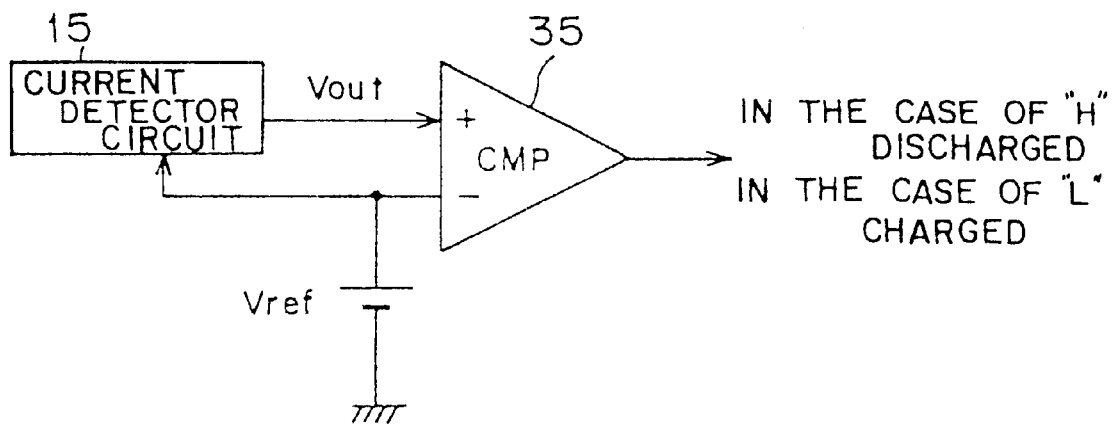
FIG. 6 shows a configuration example of a battery current direction detector circuit.

FIG. 6 shows a configuration example of a battery current direction detector circuit used in some embodiments described later. In the diagram the current detector circuit 15 shown in FIG. 4A is used, and in addition to the current detector circuit 15 is provided a comparator 35 to which the output of the current detector circuit 15 and the reference voltage $V_{ref}$ shown in FIG. 4A are inputted. The comparator 35 provides an output for indicating the discharging direction of a current as an H and the charging direction of the current as an L when the output $V_{out}$ of the current detector circuit 15 is greater than the reference voltage $V_{ref}$ and when the output $V_{out}$ of the current detector circuit 15 is less than the reference voltage $V_{ref}$, respectively. It is clear from FIG. 4B that the H and L mean discharging and charging, respectively.

As explained in the above-mentioned prior application, when charging the batteries, such a constant voltage control that the output voltage of the DC—DC converter 11 is constant is performed over a small current range, and such a constant current control that the output current of the converter is constant is performed if the current reaches a certain level. In some embodiments described later the on/off control of a switch is performed corresponding to either a constant voltage control (mode) or a constant current control (mode). For this reason, it becomes necessary to judge whether the charging of the batteries 14x and 14y is performed in a constant voltage mode or a constant current mode.

Figure 7:
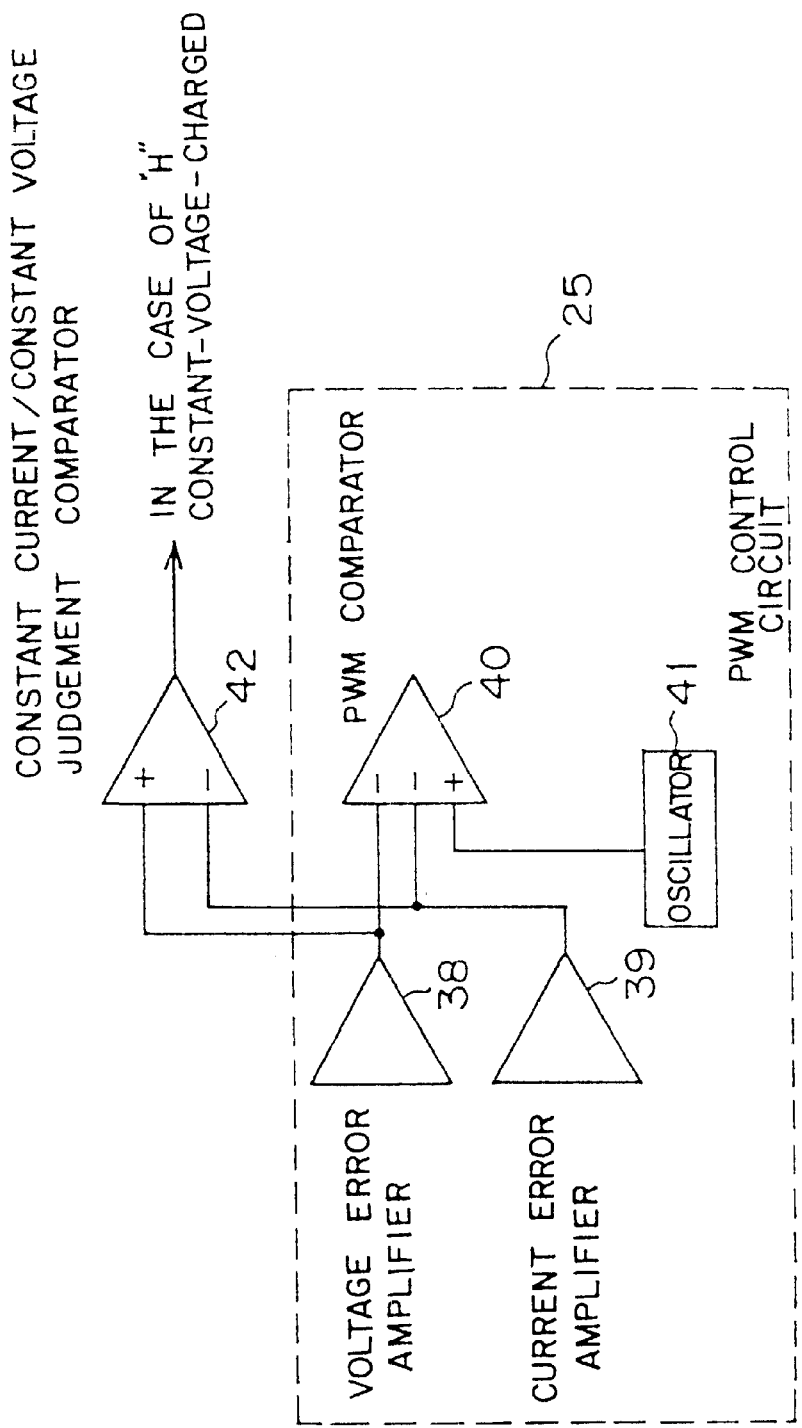
FIG. 7 shows a configuration example of a constant current/constant voltage judgement circuit.

FIG. 7 shows a configuration example of a constant current/constant voltage judgement circuit for judging whether the charging of the batteries 14x and 14y is performed in a constant voltage mode or a constant current mode. The circuit shown in FIG. 7 comprises a voltage error amplifier 38 and a current error amplifier 39 which compose the PWM control circuit 25 shown in FIG. 3, and a comparator 42 for comparing the output of the voltage error amplifier 38 and the output of a current error amplifier 39. As described above in the prior application, the PWM comparator 40 outputs a gate control signal for switching on the FET transistor 21 shown in FIG. 3 when a higher input voltage value out of the two inputs to the two inversion input terminals is lower than the voltage of a triangular wave outputted by an oscillator 41. If the output of the voltage error amplifier 38 is higher than the output of the current error amplifier 39, charging is performed in a constant voltage mode, and the gate signal of the FET 21 is controlled by the PWM control circuit 25 so that the voltage error may be reduced. On the other hand, if the output of the current error amplifier 39 is higher than the output of the voltage error amplifier 38, charging is performed in a constant current mode, and the gate signal of the FET 21 is controlled by the PWM control circuit 25 so that the current error may be reduced and the output current is constant. Accordingly, it is judged that charging is performed in a constant voltage mode and a constant current mode, if the comparator 42 outputs an H and an L, respectively.

Figure 8:
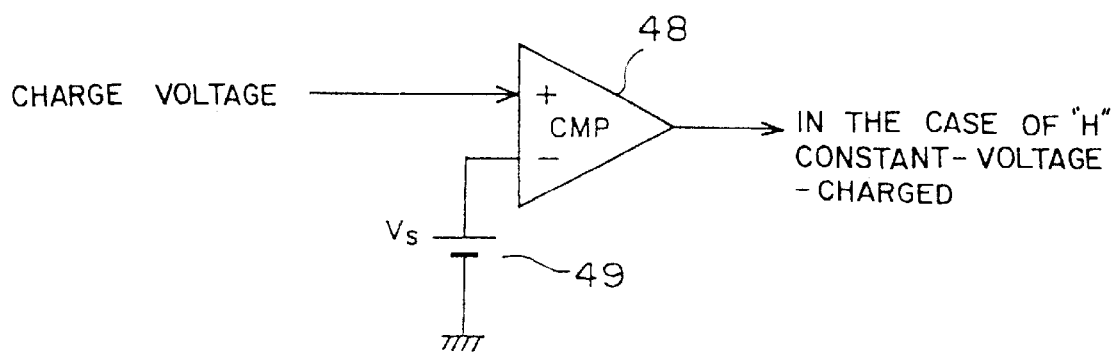
FIG. 8 shows another configuration example of a constant current/constant voltage judgement circuit.

FIG. 8 shows another configuration example of a constant current/constant voltage judgement circuit. The judgement circuit of FIG. 8 comprises a comparator 48 and a reference voltage source 49. Since when charging is performed in a constant voltage mode, the charging voltage of the batteries, for example, the output voltage of the converter 11 in FIG. 3, becomes higher than the output in a constant current mode, the comparator 48 outputs an H if the charge voltage becomes higher than the voltage Vs of the reference power source 49 corresponding to the value at the time of constant current charging, and it is judged from the output that the charging is performed in a constant voltage mode.

Figure 9:
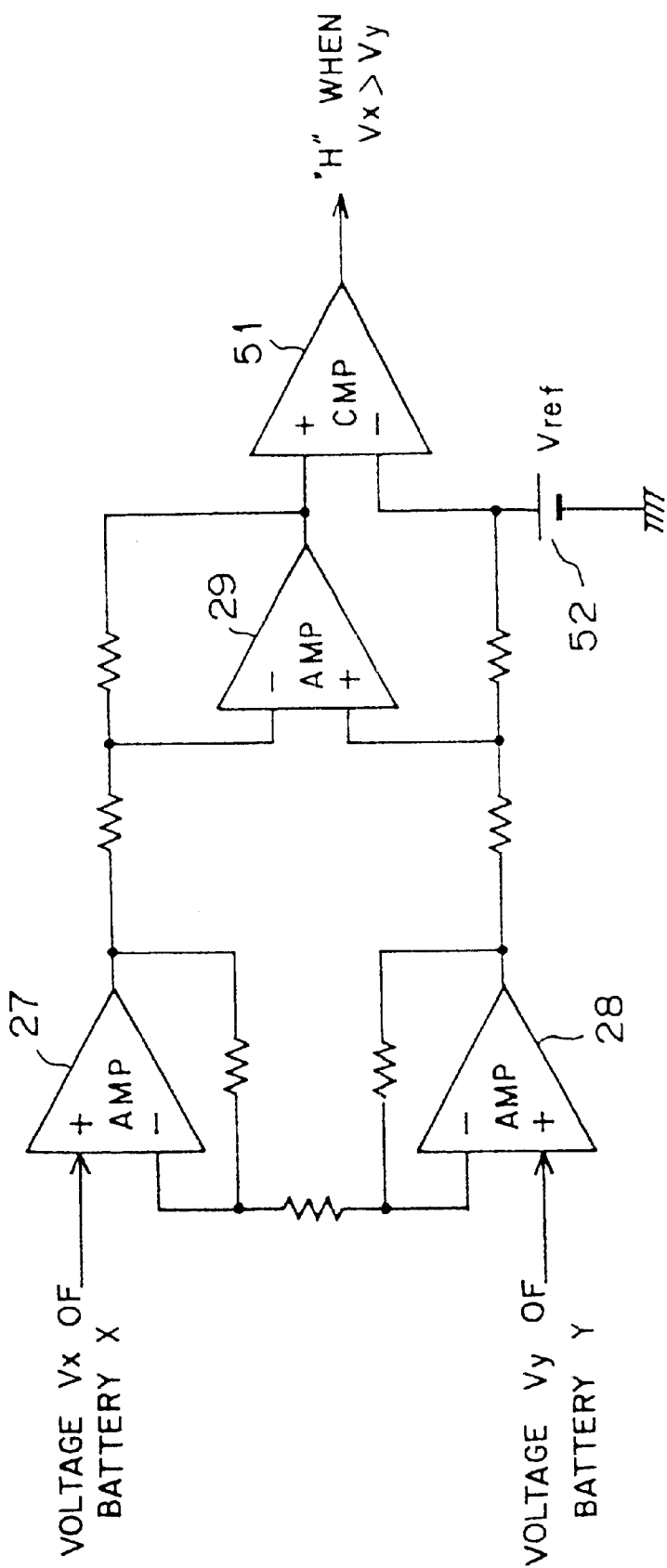
FIG. 9 shows a configuration example of a battery voltage comparator circuit.

In some embodiments described later, when charging two batteries in a constant current mode, a control is performed so that a less-charged battery may be charged first. A battery voltage comparator shown in FIG. 9 is used to compare the charge states. That is, it is judged that a battery with a higher voltage has a greater charge. Although the circuit shown in FIG. 9 is substantially the same as the battery current direction detector circuit shown in FIG. 6, the circuit shown in FIG. 9 differs in that the inputs are not the voltages across the resistor for current detection, but are the voltages Vx and Vy of both batteries. Then, the comparator 51 outputs an H when Vx>Vy.

Figure 10:
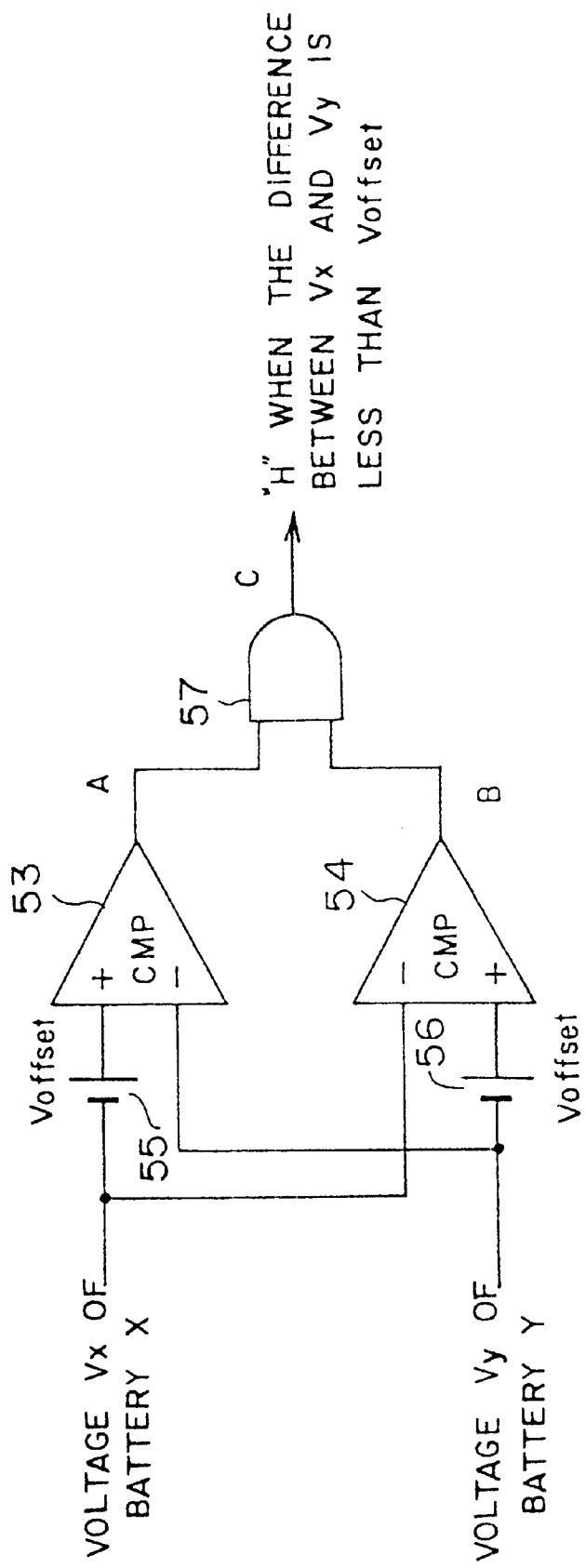
FIG. 10 shows a configuration example of a battery voltage equivalence detector circuit.

In some embodiments described later the on/off control of the switches is controlled, if the voltages of both batteries are almost the same. FIG. 10 shows a configuration example of a battery voltage equivalence detector circuit for judging whether or not the voltages of both batteries are almost the same in order to control the on/off operation. The circuit in FIG. 10 comprises two comparators 53 and 54, two offset voltage sources 55 and 56, and an AND circuit 57.

Figure 11:
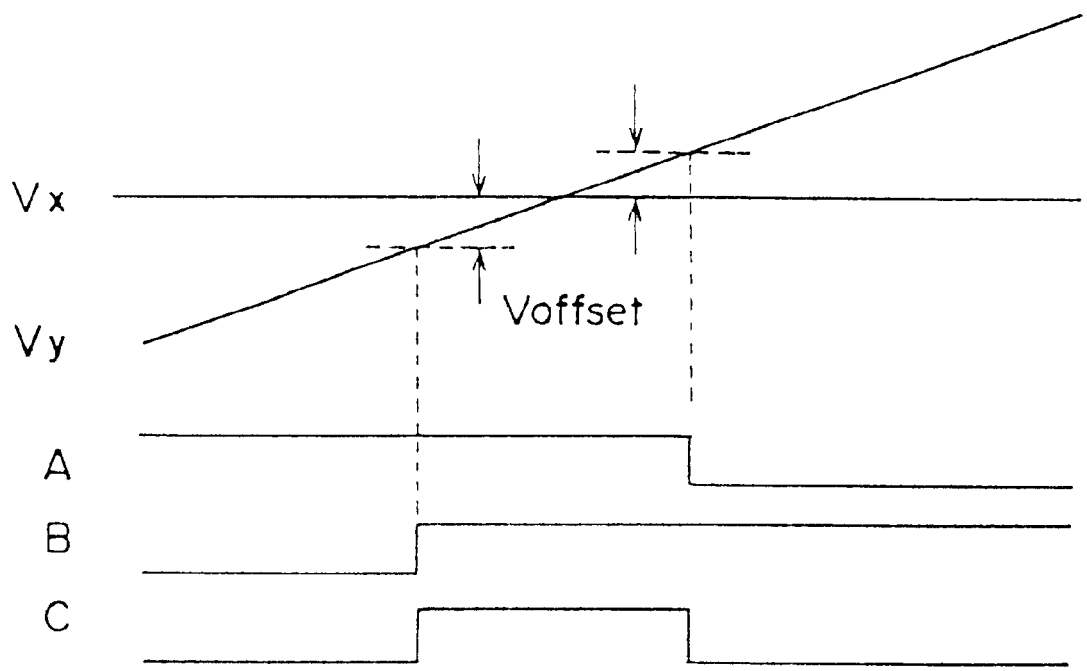
FIG. 11 explains the operation of the equivalence detector circuit shown in FIG. 10.

FIG. 11 explains the operation of the equivalence detector circuit shown in FIG. 10. In FIG. 11 the output A of the comparator 53 and the output B of the comparator 54 corresponding to the voltages Vx and Vy, respectively, and the output C of the AND circuit 57, are shown. As shown in FIG. 11, the output C of the AND circuit 57 becomes H while the sum of Vx and an offset voltage is greater than Vy, and the sum Vy and the offset voltage is greater than Vx. That is, if the absolute value of the difference between Vx and Vy is less than the offset voltage, an H for indicating that both battery voltages are equal is outputted.

Figures 12A, 12B:
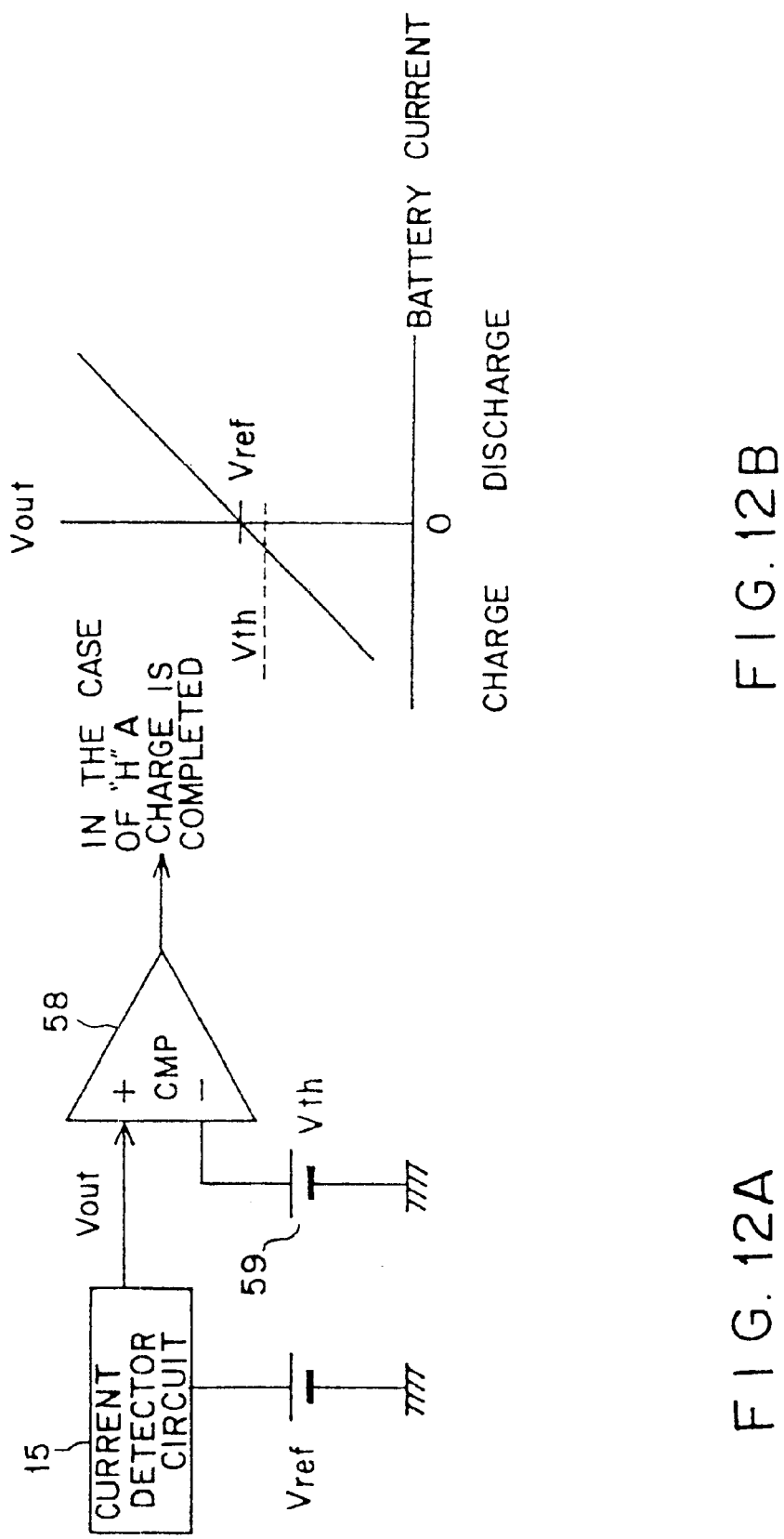
FIG. 12A shows a configuration example of a battery charge completion detector circuit.
FIG. 12B shows an example of setting a threshold voltage Vth in the battery charge completion detector circuit in FIG. 12A.

In some embodiments described later the control operation is switched, if the charging of one of the batteries is completed when charging both batteries. FIG. 12A shows a configuration example of a battery charge completion detector circuit. The detector circuit in FIG. 12A comprises a current detector circuit 15, a comparator 58 and a threshold voltage source 59 for providing the comparator 58 with a threshold voltage. Since the charging current of the battery decreases as the charge increases, the charging is judged to be completed when the charging current of the battery becomes less than a certain value. As described earlier, the battery current becomes 0 when the output of the current detector circuit reaches the reference voltage $V_{ref}$. Accordingly, by setting the threshold voltage a little bit lower than this reference voltage $V_{ref}$, as shown in FIG. 14B, the comparator 58 outputs an H indicating the completion of the charging when the output of the current detector circuit 15 exceeds the threshold voltage Vth.

Figure 13:
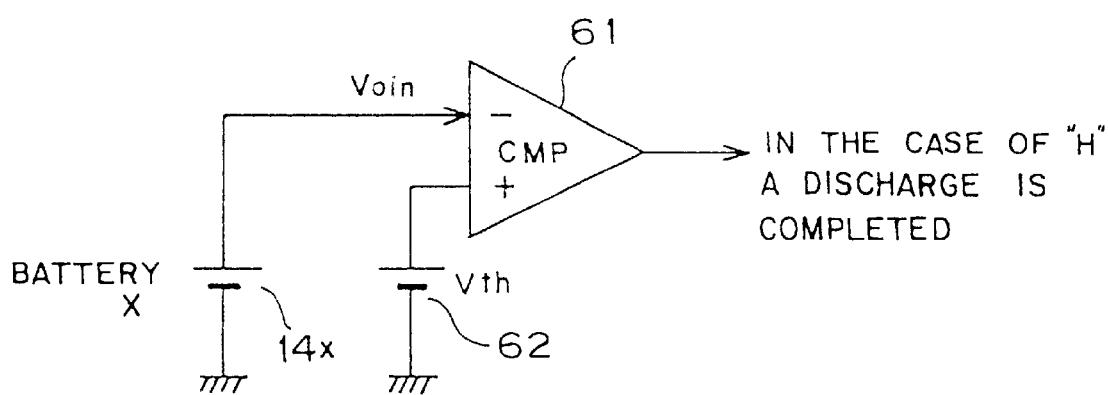
FIG. 13 shows a configuration example of a battery discharge completion circuit.

Furthermore, in some embodiments of the present invention, the control operation is switched when the discharging of one battery is completed. FIG. 13 shows a configuration example of a battery discharge completion circuit for switching the control operation. The circuit shown in FIG. 13 is for detecting the completion of the discharging of, for example, the battery 14x. The comparator 61 outputs an H indicating the completion of the discharging when the voltage of the battery 14x becomes lower than the threshold voltage Vth of the threshold voltage source 62.

Next, the embodiment of the ON/OFF control circuit 17 in FIG. 3 of the present invention is described below using a variety of the partial circuits described above.

Figure 14:
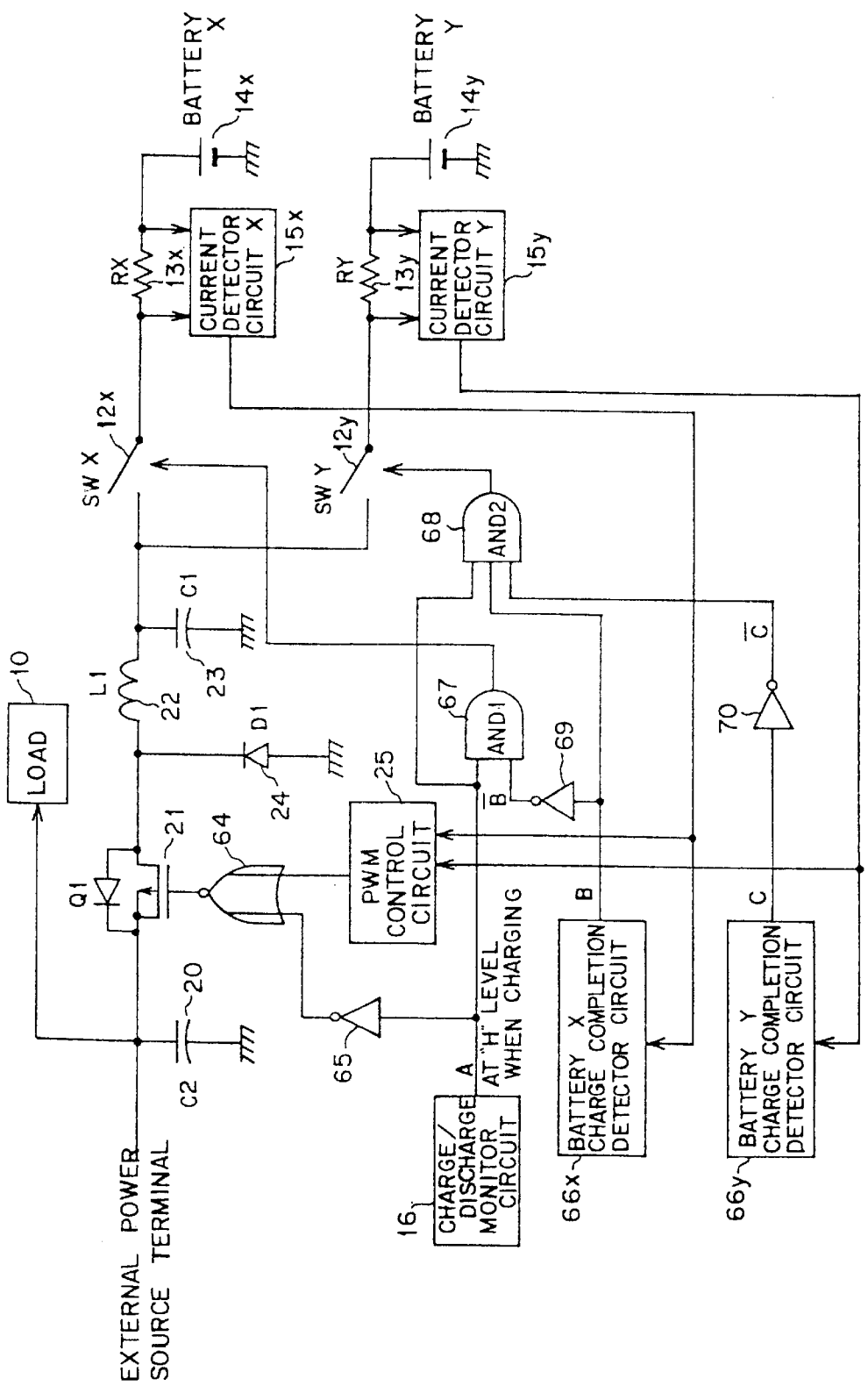
FIG. 14 shows the first embodiment of the ON/OFF control circuit of the present invention.

FIG. 14 shows the first embodiment of the ON/OFF control circuit 17 of the present invention. The ON/OFF control circuit 17 in FIG. 14 comprises a battery X charge completion detector circuit 66x, a battery Y charge completion detector circuit 66y, two AND circuits 67 and 68, and two inverters 69 and 70.

Although in FIG. 14 a NOR circuit 64 and an inverter 65 are added to the configuration of FIG. 3, the NOR circuit 64 and inverter 65 are for controlling the on/off operation of the FET 21 using the outputs of the charge/discharge monitor circuit 16 and the PWM control circuit 25. That is, the output of the charge/discharge monitor circuit 16 becomes H when charging the batteries, and the output of the inverter 65 becomes L. Thus, the output of the PWM control circuit 25 is inverted by the NOR circuit 64, and is provided to the gate of the FET 21. Since the FET 21 is, for example, a P channel device, the FET 21 is on when the output of the PWM control circuit 25 is H, that is, the output of the NOR circuit 64 is L, and the on/off operation of the FET 21 is controlled by the output of the PWM control circuit 25. On the other hand, when discharging the batteries, since the output of the charge/discharge monitor circuit 16 becomes L, the output of the inverter 65 becomes H, and the output of the NOR circuit 64 becomes L regardless of the output of the PWM control circuit 25. Accordingly, when discharging the batteries, the FET 21 is always kept on.

In the first embodiment in FIG. 14, a control operation is performed when discharging the batteries. For example, first, a switch 12x is switched on, and the battery 14x is charged. Then, after the completion of the charging, switches 12x and 12y are switched off and on, respectively, and the battery 14y is charged.

Figure 15:
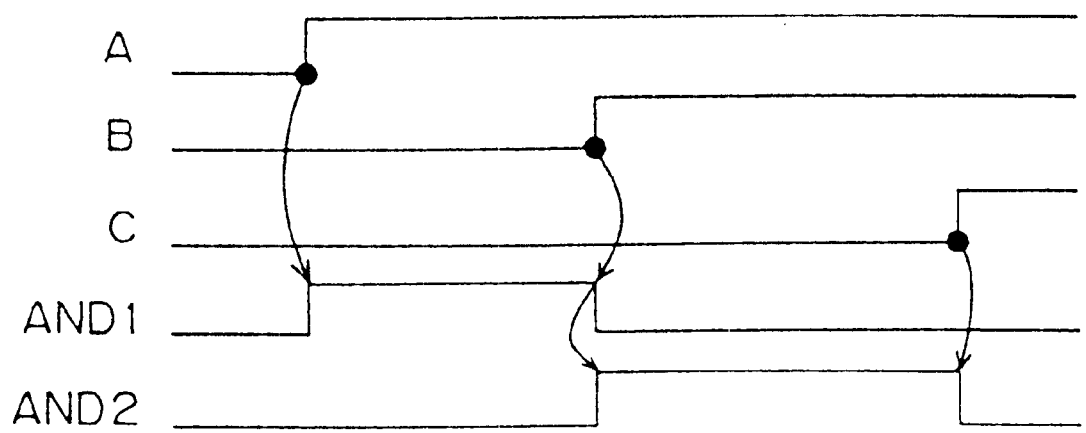
FIG. 15 is a time chart showing the operation of the first embodiment.

FIG. 15 is a time chart showing the operation of the first embodiment shown in FIG. 14. When in FIG. 14, an AC adaptor is connected and the power supply apparatus enters the charging state, the output A of the charge/discharge monitor circuit 16 becomes H. At this moment, the outputs B and C of the two charge/discharge completion detector circuits 66x and 66y are both L, and thereby the output of the AND circuit 67 (AND1) becomes H. Accordingly, the switch 12x is switched on, and the charging of the battery 14x is started.

When the charging is completed, the signal B becomes H. Accordingly, the output of the AND circuit 67 becomes L, and the switch 12x is switched off. At this moment, since the signal C is L, all the three inputs to the AND circuit 68 are H, the output becomes H, the switch 12y is switched on, and the battery 14y is charged. When the charging of the battery 14y is completed, the output C of the charge/discharge completion circuit 66y becomes H, the output of the AND circuit 68 becomes L, and the switch 12y is switched off.

Figure 16:
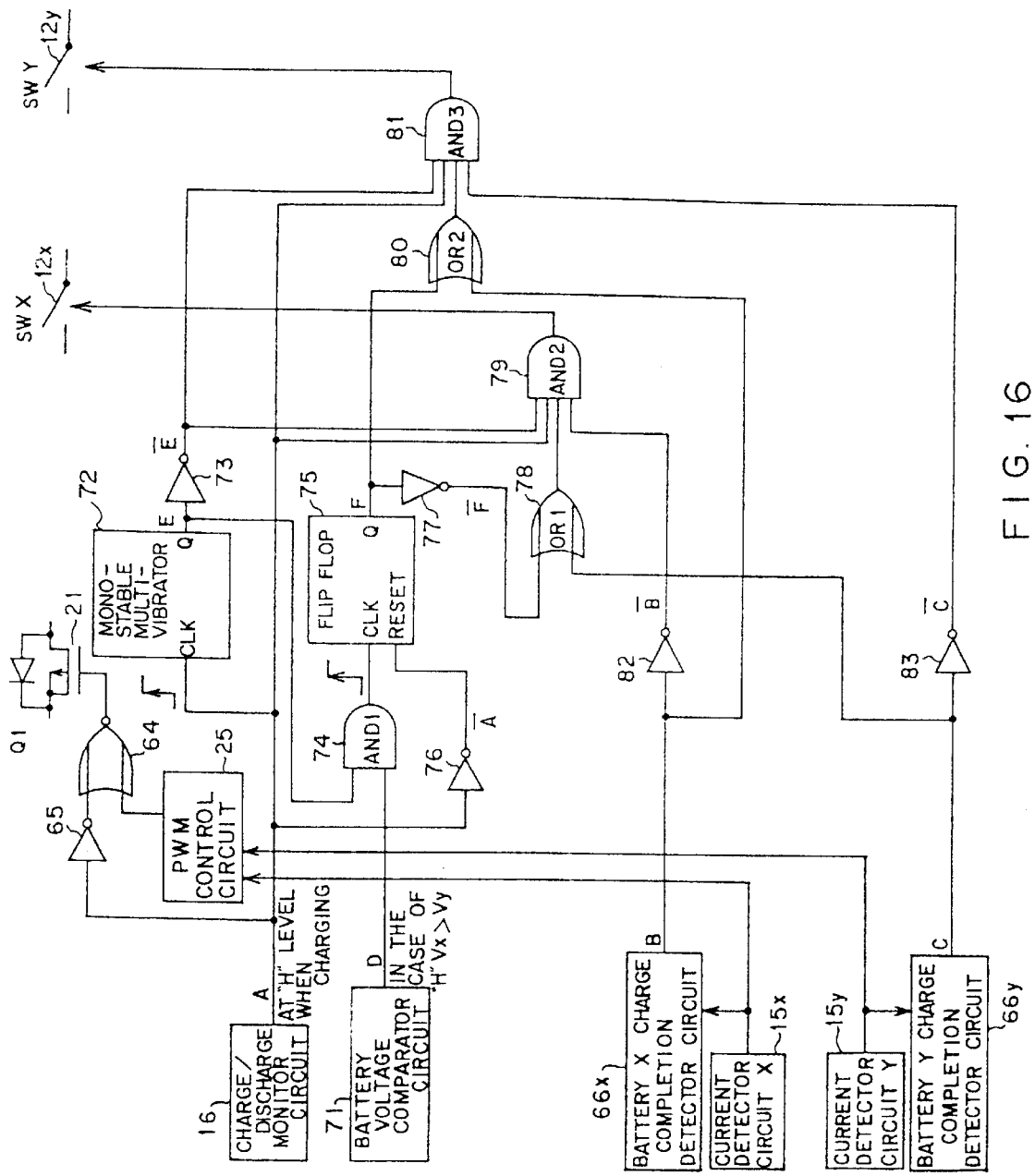
FIG. 16 shows the second embodiment of the ON/OFF control circuit of the present invention.

FIG. 16 shows the second embodiment of the ON/OFF control circuit of the present invention. The circuit of FIG. 16 comprises a battery voltage comparator circuit 71 for comparing the voltages of the two batteries 14x and 14y when charging the batteries, and two charge completion detector circuits 66x and 66y corresponding to each battery, similar to the charge completion detector circuits shown in FIG. 14. The ON/OFF control circuit compares the battery voltages when charging is started, switches on first a switch corresponding to the battery with a lower voltage, and when the charging of this battery is completed, charges the other battery.

Figure 17:
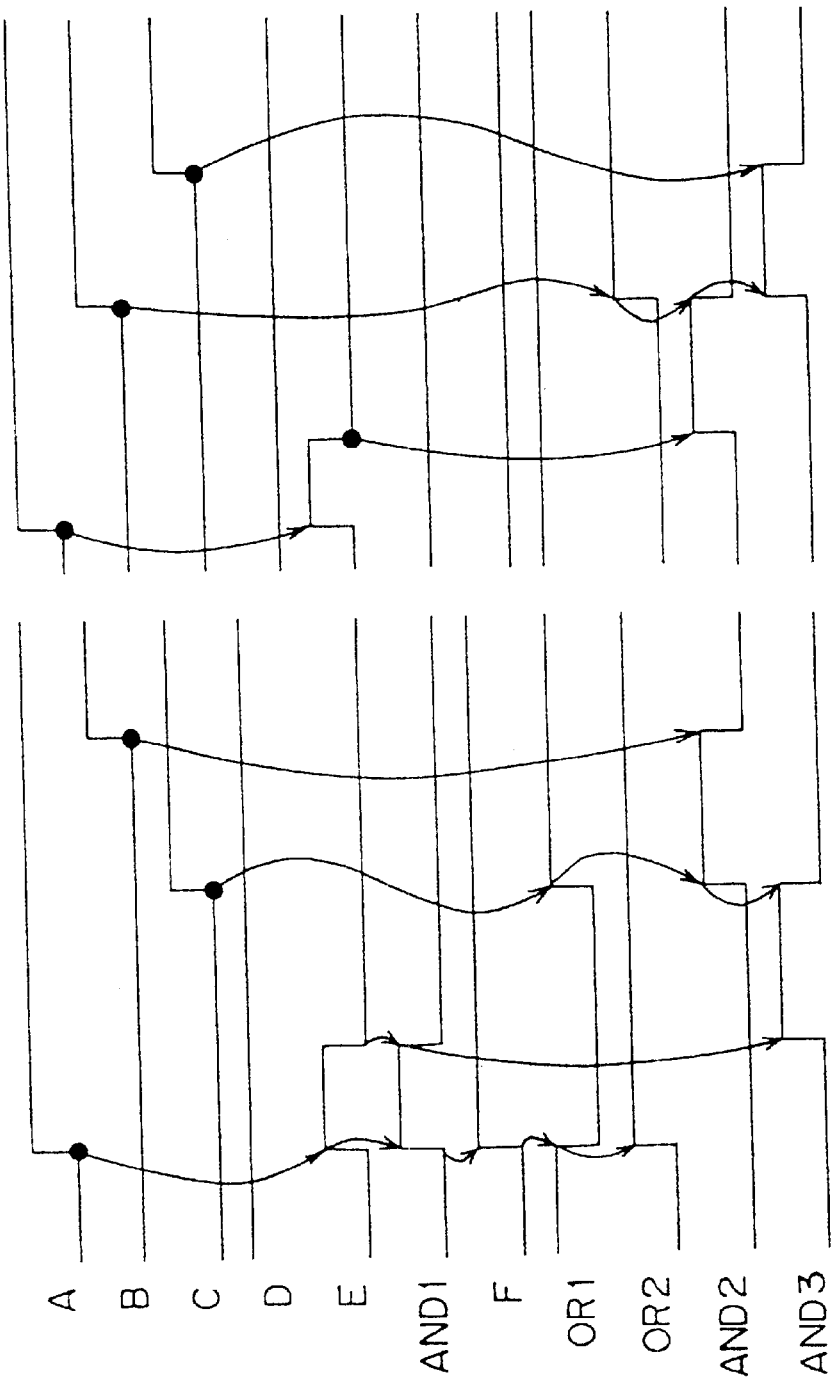
FIGS. 17A and 17B are time charts showing the operation of the second embodiment.

FIGS. 17A and 17B are time charts showing the operation of the second embodiment shown in FIG. 16. First, when the charge/discharge monitor circuit 16 in FIG. 16 detects the charging state of the power supply apparatus, the output becomes H, corresponding to which the output E of a mono-stable multi-vibrator (mono-multi) 72 becomes H. Then, the result is inputted to an AND circuit 74 (AND1). On the other hand, the battery voltage comparator circuit 71 compares the voltages of both batteries 14x and 14y, and when the voltage of the battery 14x is greater than the voltage of the battery 14y, the output D becomes H as shown in FIG. 17A. In this case, the output of the AND circuit 74 becomes H, and the output F of a flip-flop 75 also becomes H. Since the outputs B and C of the charge completion detector circuits 66x and 66y are both L at this moment, as a result the output of an OR circuit 78 (OR1) and the output of an OR circuit 80 (OR2) become L and H, respectively.

When the output E of the mono-multi 72 becomes L after a certain time elapses, the output AND1 of the AND circuit 74 becomes L, all inputs to an AND circuit 81 become H, and the output becomes H. Then, the switch 12y is switched on, and the battery 14y is charged. At this time too, since the outputs B and C of both charge completion detector circuits 66x and 66y are both L, the output of an inverter 83 is H, and this output is inputted to the AND circuit 81.

When the charging of the battery 14y is completed, the output C of the charge completion detector circuit 66y becomes H. As a result, the output AND3 of the AND circuit 81 becomes L, and the switch 12y is switched off. Simultaneously, the output of the OR circuit 78 (OR1) becomes H, as a result the output of the AND circuit 79 (AND2) becomes H. Then, the switch 12x is switched on, and the charging of the battery 14x is started.

When the charging of the battery 14x is completed, the output B of the charge completion detector circuit 66x becomes H, as a result the output AND2 of the AND circuit 79 becomes L, and the switch 12x is switched off.

FIG. 17B is a timechart showing the operation in the case where out of the two batteries, the voltage of the battery 14y is higher than the voltage of the battery 14x in an initial state. In this case, since the output D of the battery voltage comparator circuit 71 is L even if the output A of the charge/discharge monitor circuit 16 becomes H, only the output E of the mono-multi 72 becomes H. Since the outputs of two inverters 77 and 82 are both H, the output AND2 of the AND circuit 79 becomes H and the switch 12x is switched on when the output E becomes L.

When the charging of the battery 14x is completed, the output B of the detector circuit 66x becomes H, the output AND2 of the AND circuit 79 becomes L, and the switch 12x is switched off. Simultaneously, the output of the OR circuit 80 becomes H, the output AND3 of the AND circuit 81 becomes H since the output of the inverter 83 is H, and the switch 12y is switched on. Then, when the charging of the battery 14y is completed, the output C of the detector circuit 66y becomes H, the output AND 3 of the AND circuit 81 becomes L, and the switch 12y is switched off.

FIG. 18 shows the third embodiment of the ON/OFF control circuit of the present invention. The ON/OFF control circuit of the third embodiment comprises battery current direction detector circuits 86x and 86y for detecting whether the current of each battery is in a charging direction or a discharging direction, in addition to a battery voltage equivalence detector circuit 85. The ON/OFF control circuit switches off a switch on the side of the battery in which the current flows in a discharging direction when starting charging, charges the other battery in which the battery current flows in a charging direction, and when the voltage of the battery being charged and the voltage of the battery connected to the switch which is switched off become equal, the switched-off switch is also switched on. This is to prevent an abnormally increased charging current from damaging the batteries, because when the charges in the batteries are imbalanced, the less-charged battery is charged by the charged battery when starting charging.

Figure 19A:
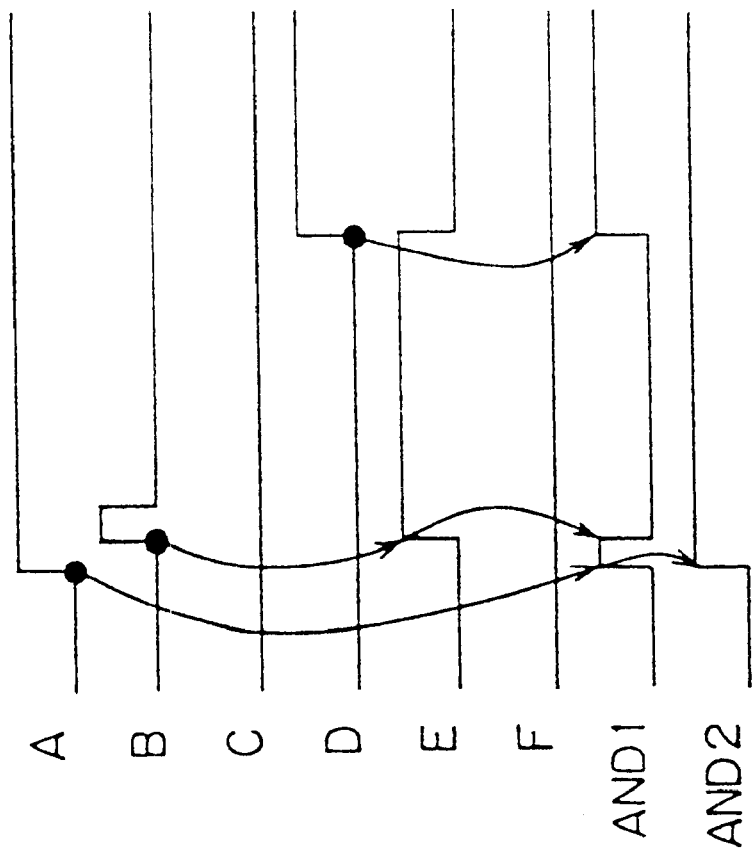
FIGS. 19A and 19B are time charts showing the operation of the third embodiment.
Figure 19B:
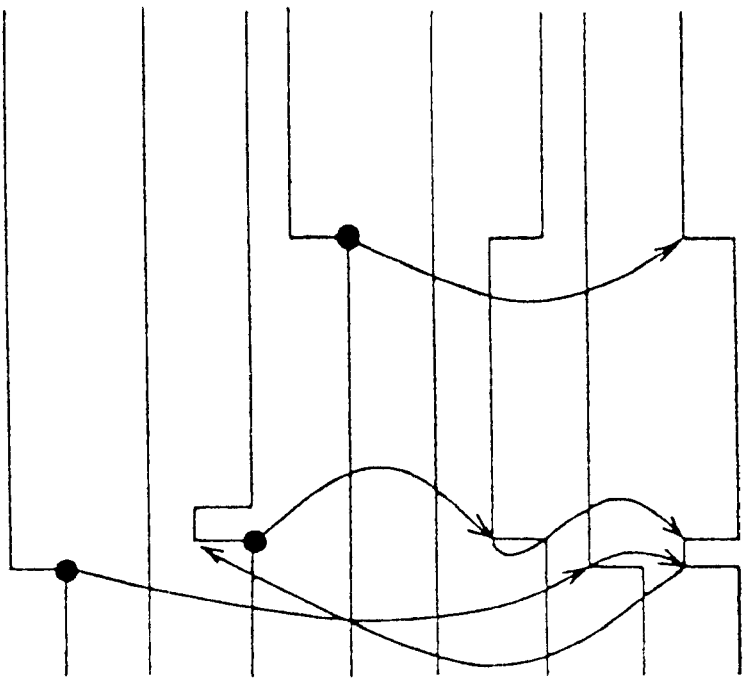

FIGS. 19A and 19B are time charts showing the operation of the third embodiment in FIG. 18. FIG. 19A is a timechart in the case where it is judged that the charge of the battery 14x is greater than the charge of the battery 14y and the current flows in a discharging direction, when starting charging. When the power supply apparatus enters a charging state and the output A of the charge/discharge monitor circuit 16 in FIG. 18 becomes H, the outputs of two inverters 89 and 90 are both H, since the outputs of two battery current direction detector circuits 86x and 86y are both L. As a result, the outputs of two AND circuits 91 and 92 (AND1 and AND2) become both H, two switches 12x and 12y are both switched on, and the battery current direction is detected.

When, as mentioned above, it is judged that the charge of the battery 14x is greater than the charge of the battery 14y and the battery current flows in a discharging direction, the output B of the battery current direction detector circuit 86x becomes H, as a result the output E of a flip-flop 87 becomes H, and the output AND1 of the AND circuit 91 becomes L. Thus, the switch 12x is switched off and only the battery 14y is charged.

When the voltage of the battery 14x rises and it is judged by the battery voltage equivalence detector 85 that the voltage of the battery 14x becomes equal to the voltage of the battery 14y, the output D of the battery voltage equivalence detector 85 becomes H, and the output E of the flip-flop 87 is reset and becomes L. As a result, the output of the AND circuit 91 becomes H, the switch 12x is switched on, and both batteries are charged.

FIG. 19B is a timechart in the case where the charge of the battery 14y is greater than the charge of the battery 14x. In this case, although there are some differences from the case shown in FIG. 19A in that the output of the battery current direction detector circuit 86y becomes H, the basic operations are the same as those in FIG. 19A. Therefore, the detailed description is omitted here.

Figure 20:
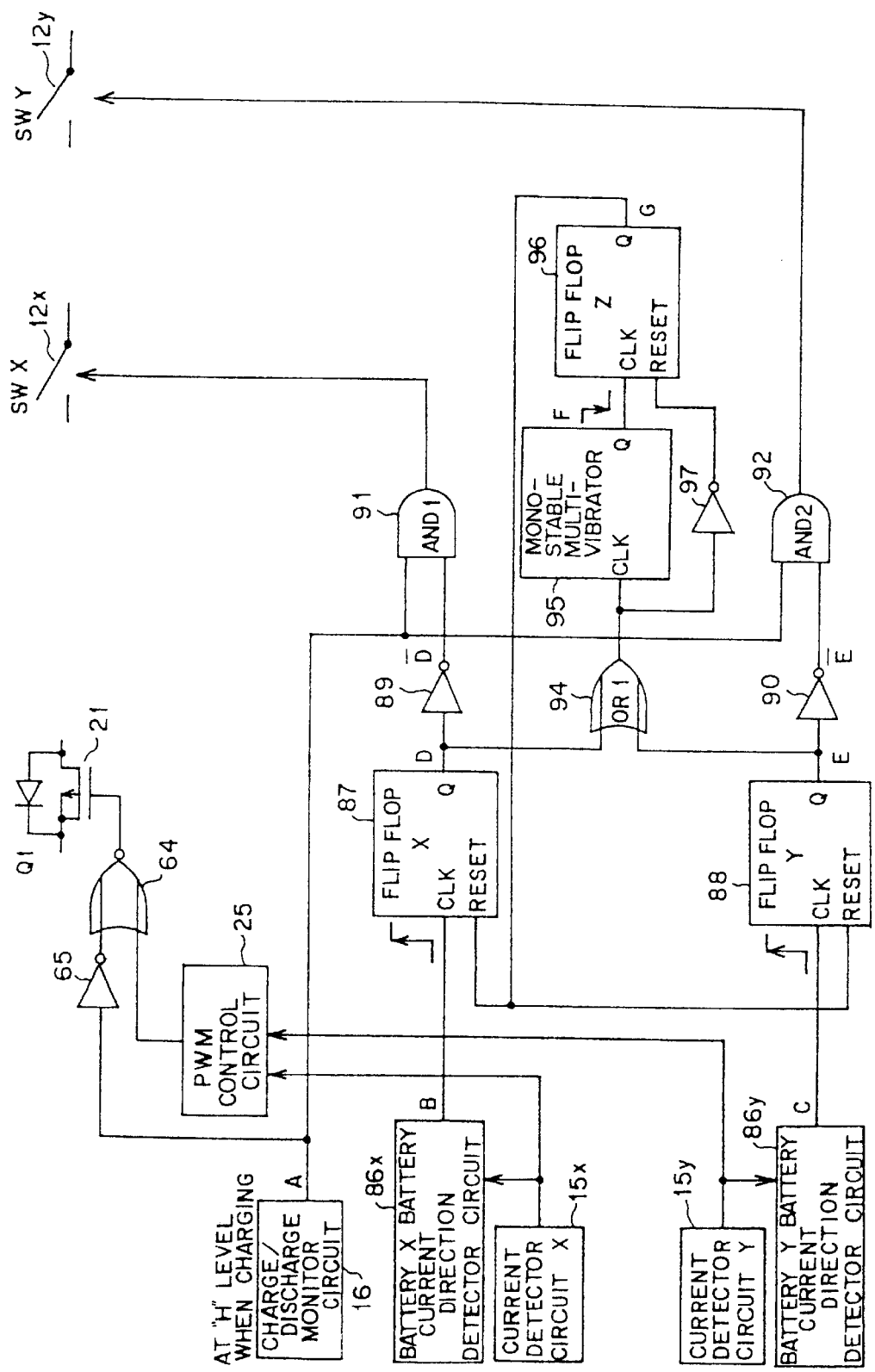
FIG. 20 shows the fourth embodiment of the ON/OFF control circuit of the present invention.

FIG. 20 shows the fourth embodiment of the ON/OFF control circuit of the present invention. Although in this fourth embodiment, when starting charging, the direction of each battery current is detected in the same way as in FIG. 18, a switch on the side of the battery in which the current flows in a discharging direction is switched off, and the other battery is charged, the embodiment differs from that in FIG. 18 in that after a certain time elapses, the two switches are both switched on, and the operations of the detection of the direction of the battery current and after are repeated. For this reason, in FIG. 20 a mono-multi 95 for specifying this certain time, an OR circuit 94 at the input stage of the mono-multi 95, a flip-flop 96 at the output stage of the mono-multi 95, and an inverter 97 for resetting the flip-flop 96 are added to the configuration shown in FIG. 18.

Figure 21:
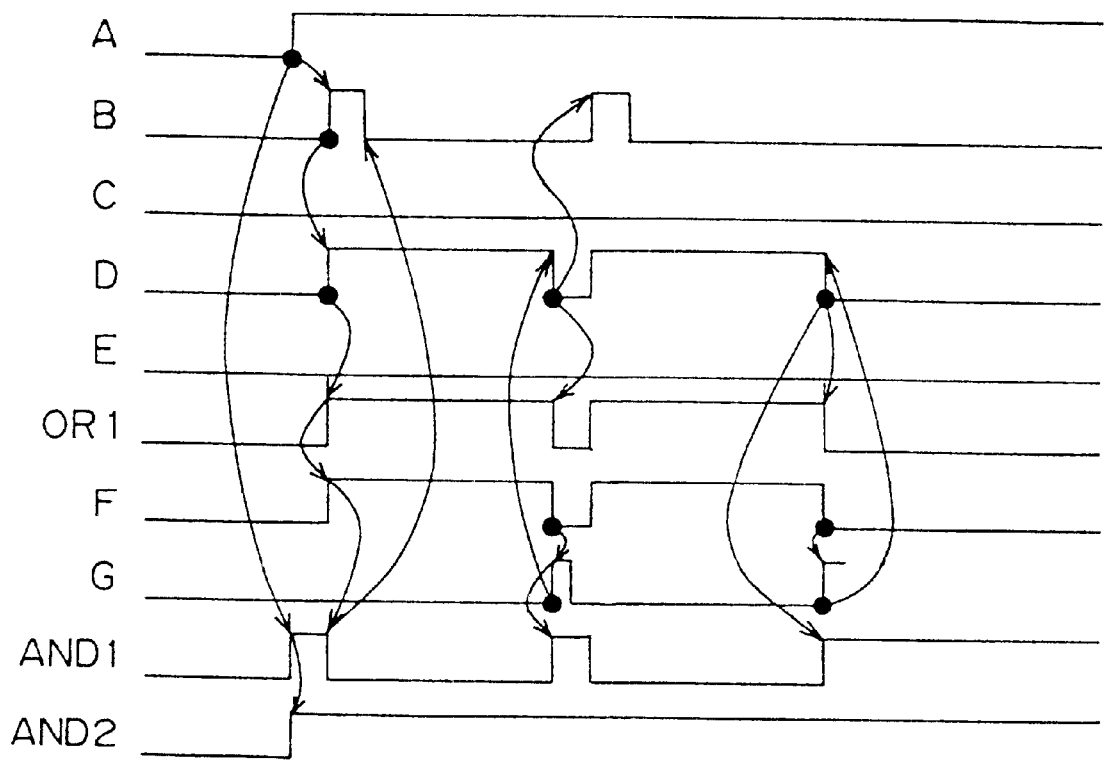
FIG. 21 is a time chart showing the operation of the fourth embodiment.

FIG. 21 is a time chart showing the operation of the fourth embodiment shown in FIG. 20. When the apparatus enters a charging state and the output A of the charge/discharge monitor circuit 16 becomes H, the outputs of the two AND circuits 91 and 92 become H as shown in FIG. 18, the switches 12x and 12y are both switched on, and the directions of the battery currents are detected by the two current direction detector circuits 86x and 86y. As shown in FIG. 19A, when the current of the battery 14x is judged to be in a discharging direction, the output B of the detector circuit 86x becomes H. Accordingly, in FIG. 21, the output D of the flip-flop 87, the output of the OR circuit 94 (OR1) and the output F of the mono-multi 95 all become H, the output AND1 of the AND circuit 91 becomes L, and the switch 12x is switched off.

After a certain time corresponding to the output pulse width of the mono-multi 95 elapses, the output F of the mono-multi 95 becomes L, and as a result the output G of the flip-flop 96 operating on the falling edge becomes H. Then, the flip-flop 87 is reset, the output D of the flip-flop 87 becomes L, and the output AND1 of the AND circuit 91 becomes H. Since the output of the OR circuit 94 becomes L, the output of the inverter 97 becomes H, and as a result, the flip-flop 96 is reset, the period where the output G of the flip-flop 96 remains H becomes very short.

When the switch 12x is also switched on, the direction of the battery current is again detected and it is judged that the current direction of the battery is in a discharging direction, the output B of the detector circuit 86x becomes H again, as a result the output D of the flip-flop 87, the output OR1 of the OR circuit 94 and the output F of the mono-multi 95 all become H. Then, the output AND1 of the AND circuit 91 becomes L, the switch 12x is switched off and the charging of the battery 14y is continued.

When the output F of the mono-multi 95 becomes L again, the output G of the flip-flop 96 becomes H, and the output D of the flip-flop 87 and the output OR1 of the OR circuit 94 both become L. As a result, the output AND1 of the AND circuit 91 becomes H, and the switch 12x is switched on. If the results of the current direction detections for the two batteries are both charging directions, after that both batteries 14x and 14y are charged.

Figure 22:
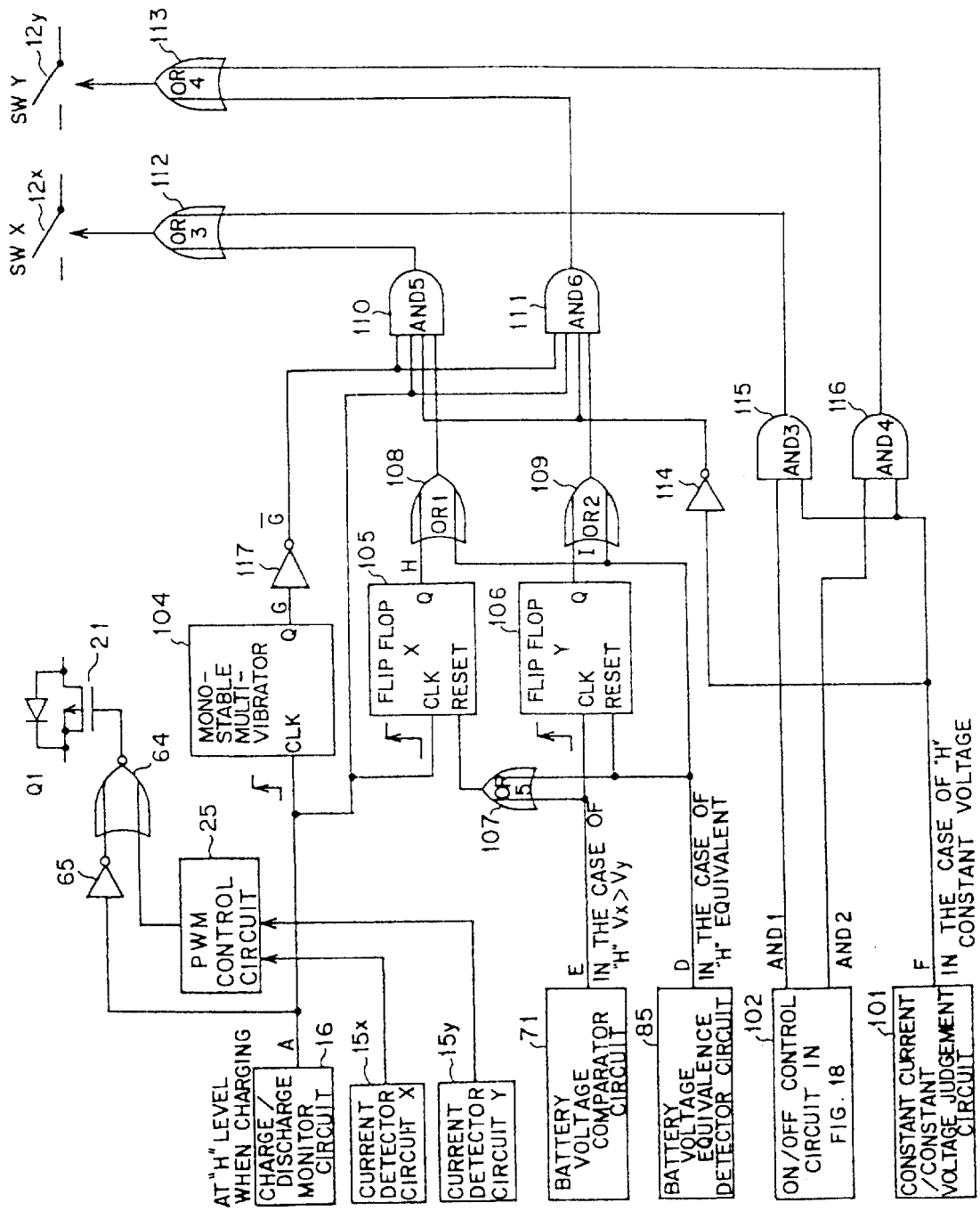
FIG. 22 shows the fifth embodiment of the ON/OFF control circuit of the present invention.

FIG. 22 shows the fifth embodiment of the ON/OFF control circuit of the present invention. In the fifth embodiment, when charging is started the batteries, it is judged whether a charging is performed in a constant current mode or in a constant voltage mode. In the case of a constant voltage mode charging is controlled in the same way as in the third embodiment shown in FIG. 18, while in the case of a constant current mode the voltages of two batteries are compared, the battery with a lower voltage is charged first, and when it is judged that the voltages of both batteries become equal, both batteries are charged.

A constant current/constant voltage judgement circuit 101 in FIG. 22 outputs a H while charging is performed in a constant voltage mode, as shown in FIGS. 7 and 8. In the constant voltage mode the output of the ON/OFF control circuit 102 in FIG. 18, that is, the outputs of two AND circuits 91 and 92 become valid, and these outputs are used for the on/off control of the two switches 12x and 12y through AND circuits 115 and 116 (AND3 and AND4) and OR circuits 112 and 113 (OR3 and OR4). In the case of the constant current mode the constant current/constant voltage judgement circuit 101 outputs an L, which is provided to the two AND circuits 110 and 111 (AND5 and AND6) through an inverter 114. The on/off control by these two AND circuits of both switches becomes available by using these outputs.

Figure 23B:
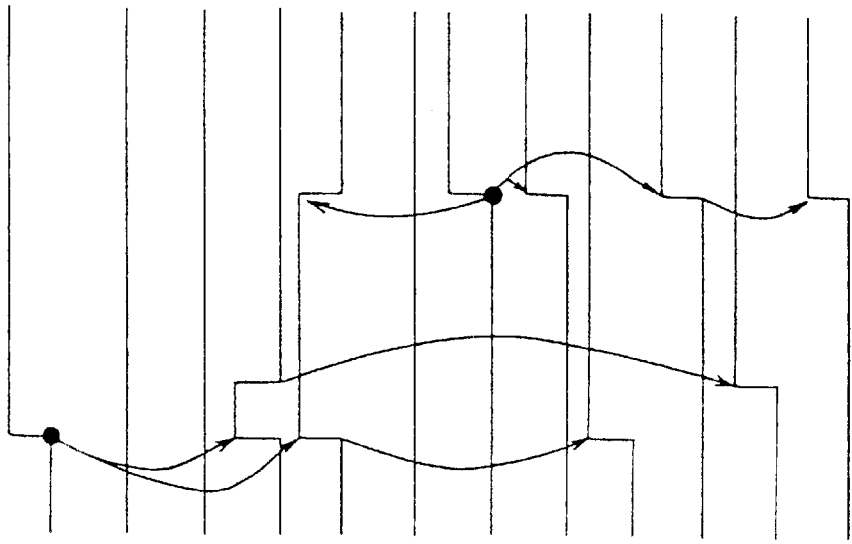
FIGS. 23A and 23B are time charts showing the operation of the fifth embodiment.
Figure 23A:
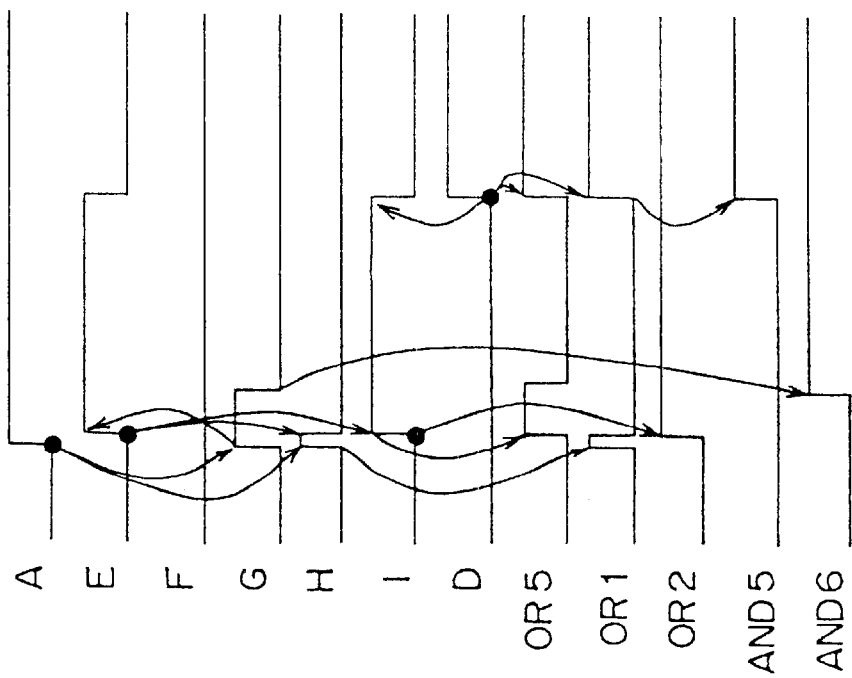

FIGS. 23A and 23B are time charts showing the operation of the fifth embodiment. FIG. 23A is a timechart in the case where the voltage of the battery 14x is higher than the voltage of the battery 14y. When the output A of the charge/discharge monitor circuit 16 shown in FIG. 22 becomes H, the output G of a mono-multi 104, the output H of a flip-flop 105 and the output of an OR circuit 108 (OR1) all become H. Then, when the output E of a battery voltage comparator circuit 71 becomes H, which indicates that the voltage of the battery 14x is higher than the voltage of the battery 14y, the output of an OR circuit 107 (OR5) becomes H, the flip-flop 105 is reset, and the output H of the flip-flop 105, the output OR1 of the OR circuit 108 both become L. The output I of a flip-flop 106 and the output of an OR circuit 109 (OR2) are both H. After a certain time corresponding to the output pulse width of the mono-multi 104 elapses, the output G of the mono-multi 104 becomes L, the output of an inverter 117 becomes H, as a result the output AND6 of the AND circuit 111 becomes H, and the switch 12y is switched on through the OR circuit 113.

When it is judged by a battery voltage equivalence detector circuit 85 that the voltages of both batteries become equal and the output D of the battery voltage equivalence detector circuit 85 becomes H, the flip-flop 106 is reset, but the output OR2 of the OR circuit 109 remains H, and the output OR1 of the OR circuit 108 also becomes H. Thus, since the output AND5 of the AND circuit 110 becomes H and the output AND6 of the AND circuit 111 remains H, both switches 12x and 12y are switched on and both batteries are charged.

FIG. 23B is a timechart in the case where the voltage of the battery 14y is higher than the voltage of the battery 14x when charging is started. In this case, when the output A of the charge/discharge monitor circuit 16 becomes H, the output G of the mono-multi 104, the output H of the flip-flop 105 and the output of the OR circuit 108 all become H. Then, when the output G of the mono-multi 104 becomes L, the output AND5 of the AND circuit 111 becomes H, the switch 12x is switched on and the charging of the battery 14x is started. When the output D of the battery voltage equivalence detector circuit 85 becomes H, the output OR2 of the OR circuit 109 becomes H. As a result, both outputs of the AND circuit 111 and the OR circuit 113 become H, the switch 12y is switched on and both batteries are charged.

FIG. 24 shows the sixth embodiment of the ON/OFF control circuit of the present invention. In this embodiment, when the status of the power supply apparatus charges to a battery discharge state, out of the two batteries one battery is first discharged, and when the discharging completion of this battery is detected, the other battery is discharged.

Figure 25:
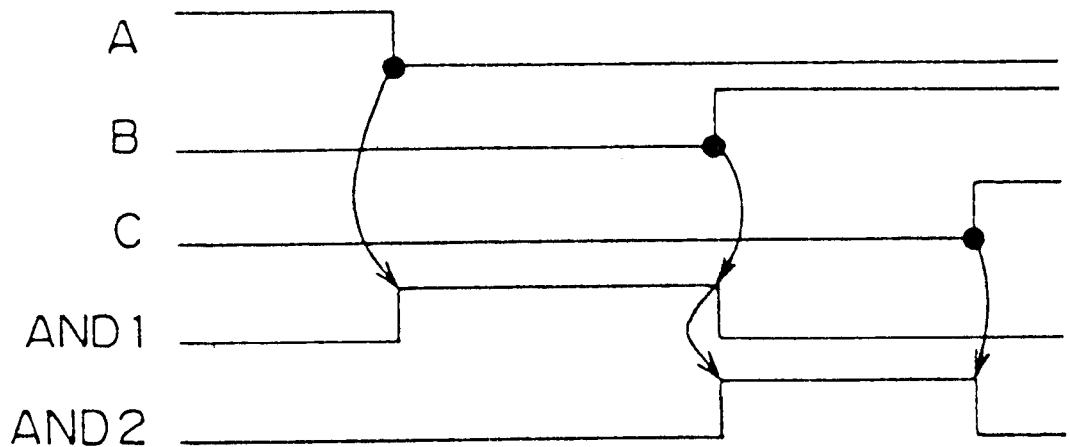
FIG. 25 is a time chart showing the operation of the sixth embodiment.

FIG. 25 is a time chart showing the operation of the sixth embodiment shown in FIG. 24. The timechart is described assuming that the battery 14x is first discharged in the diagram. First, when the output A of the charge/discharge monitor detector circuit 16 becomes L, which indicates that the battery is in a discharging state, the output of an AND circuit 123 (AND1) becomes H, the switch 12x is switched on and the battery 14x is discharged, since at this moment the outputs B and C of two discharge completion detector circuits 66x and 66y are L, which indicates that the discharging of the battery is not completed.

When the discharging of the battery 14x is completed, the output B of the discharge completion detector circuit 66x becomes H, the output of the AND circuit 123 becomes L, and the output of an AND circuit 124 (AND2) becomes H. Thus the switch 12y is switched on and the battery 14y is discharged. Then, when the discharging of the battery 14y is also completed, the output C of the discharge completion detector circuit 66y also becomes H, the output of the AND circuit 124 becomes L, and the switch 12y is switched off.

Figure 26:
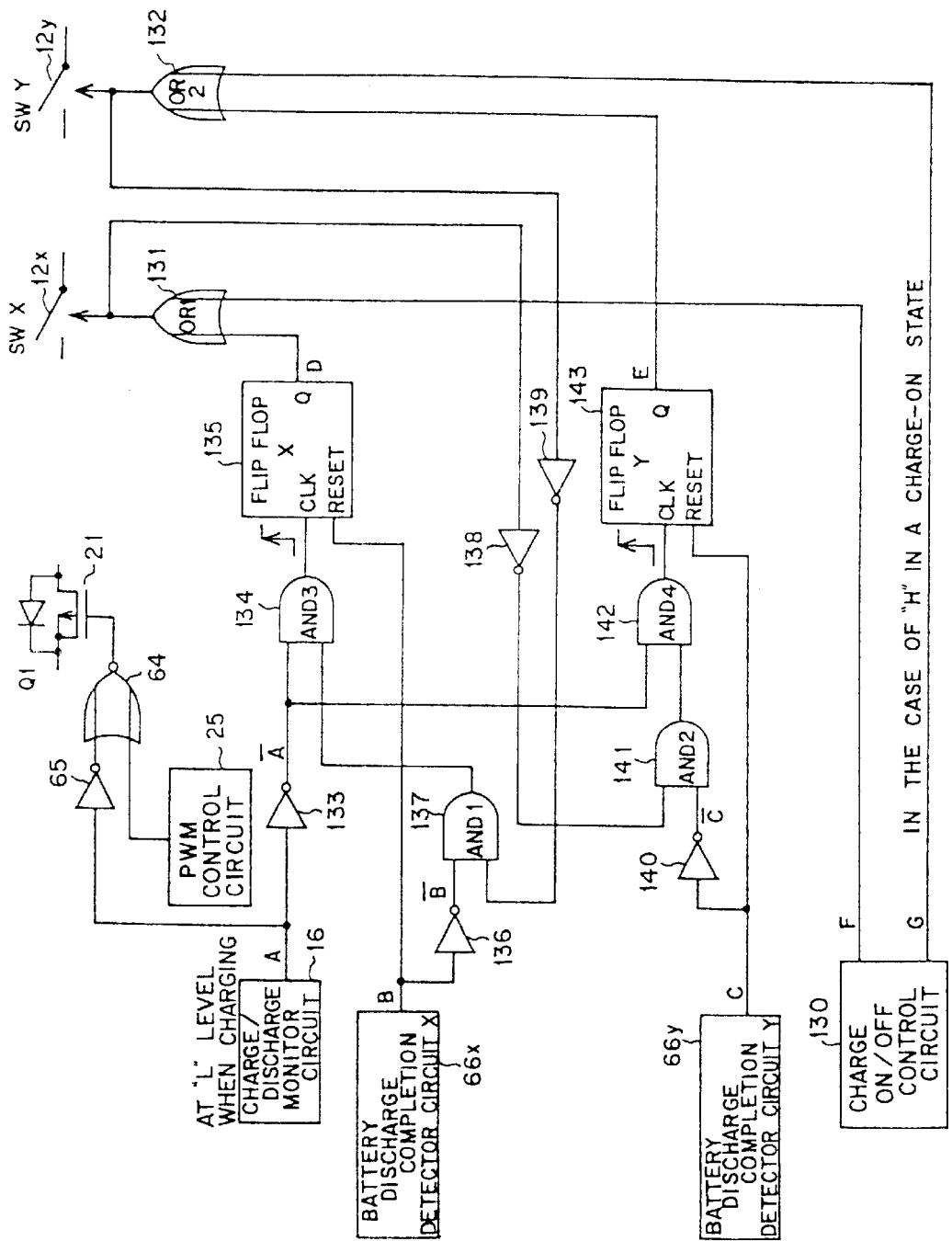
FIG. 26 shows the seventh embodiment of the ON/OFF control circuit of the present invention.

FIG. 26 shows the seventh embodiment of the ON/OFF control circuit of the present invention. In the seventh embodiment the power supply apparatus moves to a discharging state in a condition where the charge has been so far controlled, that is, the on/off operation of the two switches has been maintained. When out of the two switches, for example, a switch 12x is switched on and a battery 14x is charged, the state of the switched is maintained so that the battery 14x is discharged first. Then, after the discharging of this battery 14x is completed, the other battery 14y is discharged in the same way as the sixth embodiment shown in FIG. 24.

Figure 27:
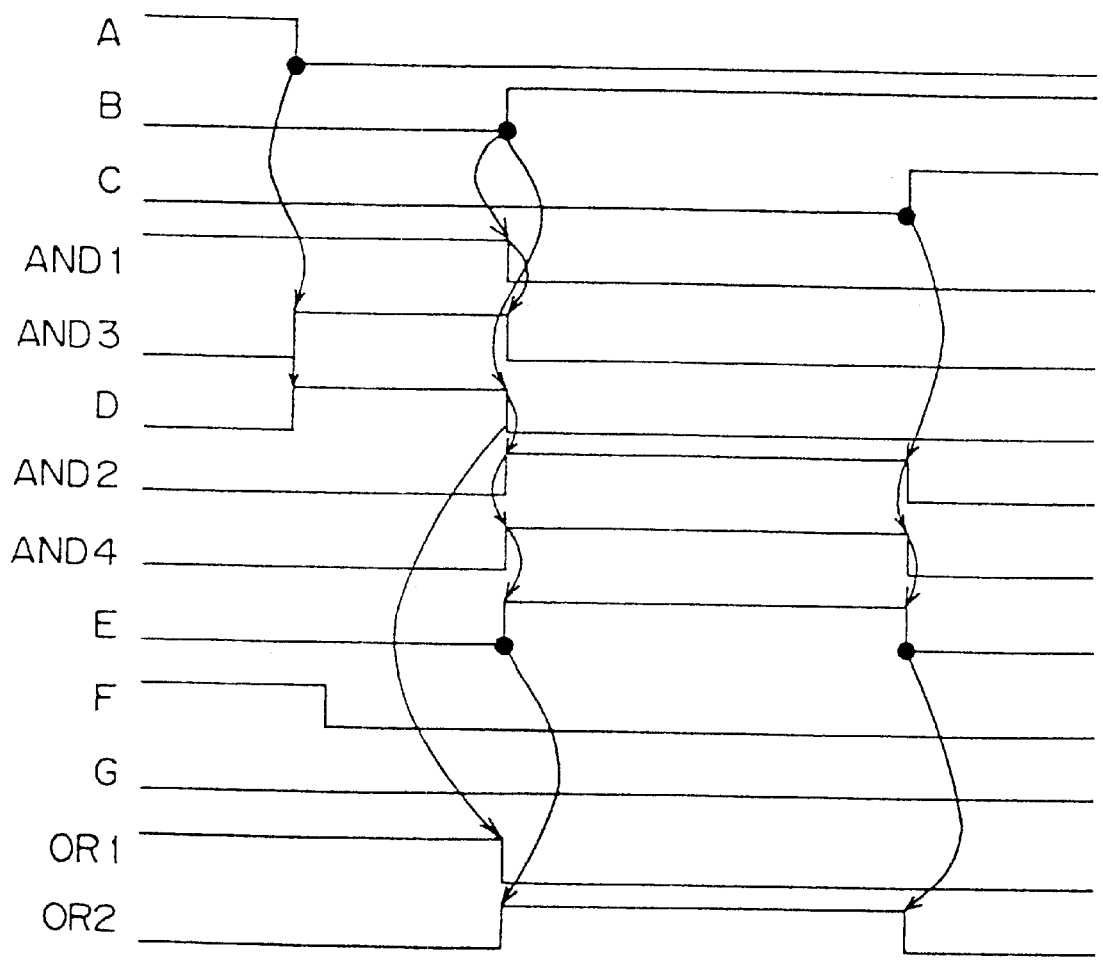
FIG. 27 is a time chart showing the operation of the seventh embodiment.

FIG. 27 is a time chart showing the operation of the seventh embodiment shown in FIG. 26. In FIG. 26, the status of the batteries charges to a discharging state in a condition where out of the two outputs of a charge ON/OFF control circuit 130, an output F is H and the switch 12x is switched on through an OR circuit 131 (OR1).

When the output A of a charge/discharge monitor circuit 16 becomes L, the output of an inverter 133 becomes H. On the other hand, since the output of an OR circuit 132 (OR2) and the output B of a discharge completion detector circuit 66x are both L, the output of an AND circuit 137 (AND1) is H. For this reason, the output of an AND circuit 134 (AND3) and the output D of a flip-flop 135 become both H, the output of the OR circuit 131 remains H, even if the output F of the charge ON/OFF control circuit 130 becomes L, and the switch 12x is kept on.

When the discharge completion detector circuit 66x detects the discharging completion of the battery 14x, the output B of the discharge completion detector circuit 66x becomes H, and the output D of the flip-flop 135 is reset. Then, the output OR1 of the OR circuit 131 becomes L, and the switch 12x is switched off. Since the output OR1 of the OR circuit 131 becomes L, the output of an inverter 138 becomes H. Since at this time the output C of a discharge completion detector circuit 66y is L, the outputs of AND circuits 141 (AND2) and 142 (AND4), the output E of a flip-flop 143 and the output OR2 of the OR circuit 132 all become H, a switch 12y is switched on, and the battery 14y is discharged.

When the discharging of the battery 14y is completed, the output C of a discharge completion detector circuit 66y becomes H. For this reason, the outputs of the AND circuits 141 and 142 the output E of the flip-flop 143 and the output of the OR circuit 132 all become L, and the switch 12y is switched off. For the discharge ON/OFF control circuit 139 of this seventh embodiment any of the ON/OFF control circuits of the first through fifth embodiments can be used.

Figure 28:
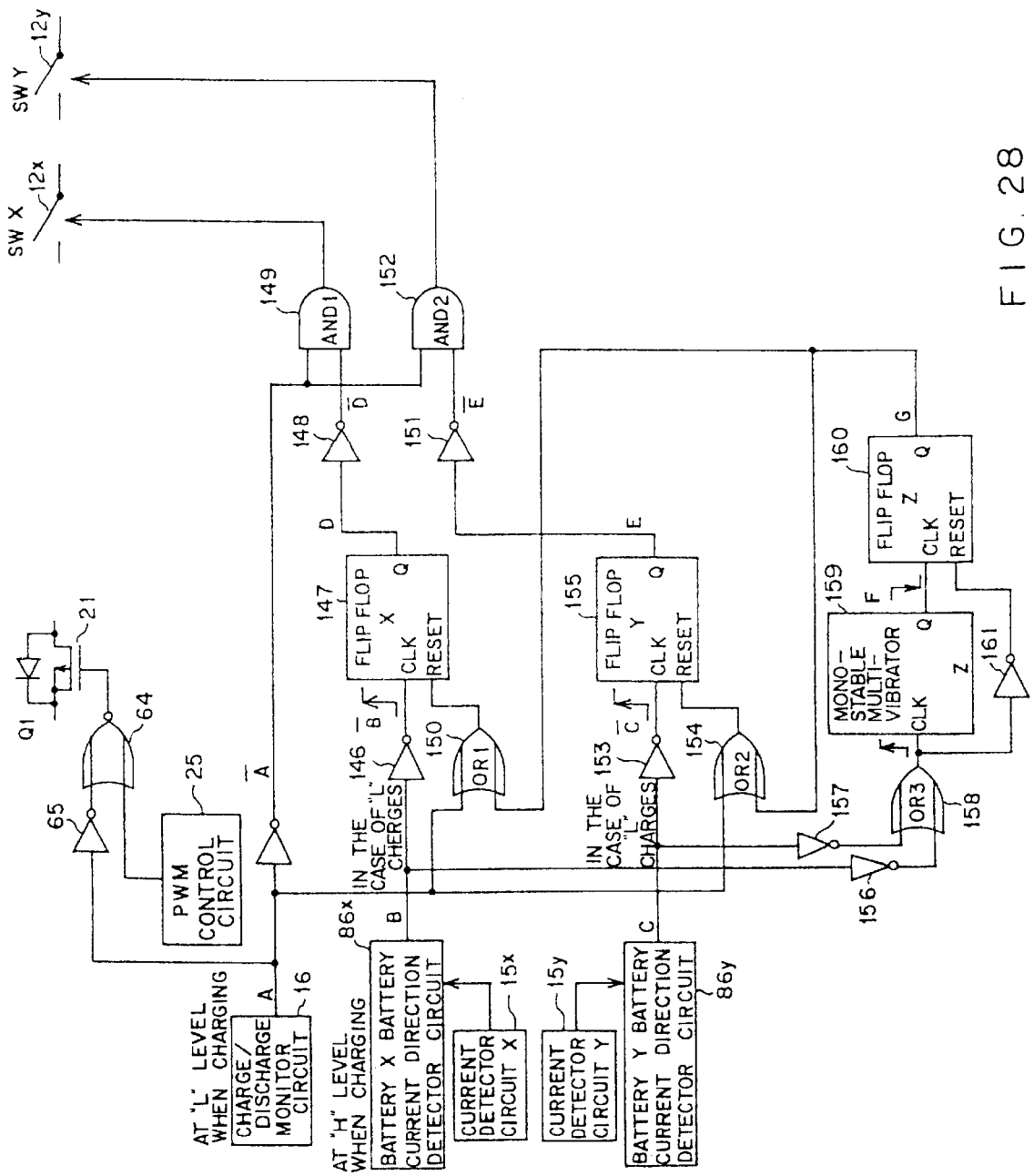
FIG. 28 shows the eighth embodiment of the ON/OFF control circuit of the present invention.

FIG. 28 shows the eighth embodiment of the ON/OFF control circuit of the present invention. In this eighth embodiment, when the status of the batteries of the power supply apparatus charges to a discharging state, the detection of the current direction of the batteries is performed, a switch corresponding to the battery in which the battery current flows in a charging direction is switched off, and the other battery is discharged. Then, every time a certain time elapses, the directions of the battery currents are detected, and the control corresponding to the result is repeated in the same way.

Figure 29:
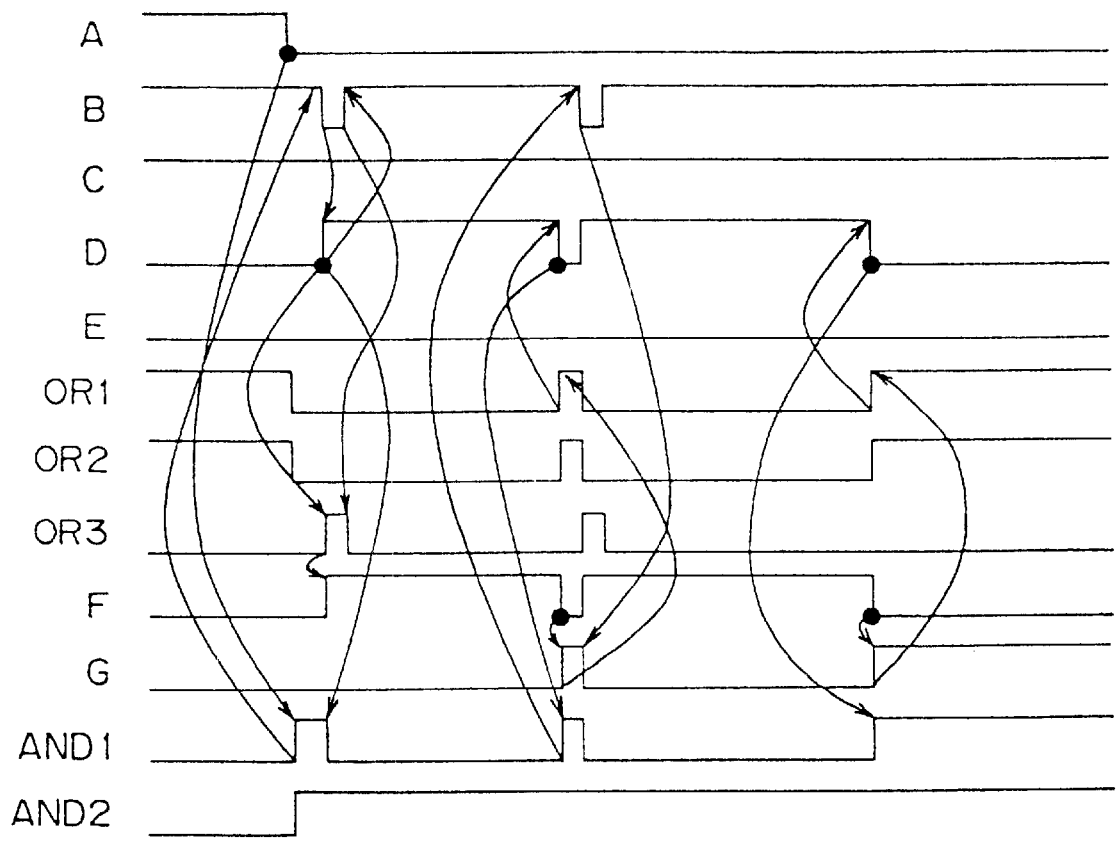
FIG. 29 is a time chart showing the operation of the eighth embodiment.

FIG. 29 is a time chart showing the operation of the eighth embodiment shown in FIG. 28. The timechart shown in FIG. 29 is described for the case where it is judged that out of the two batteries 14x and 14y, the current of the battery 14x is in a charging direction.

When the output A of the charge/discharge monitor circuit 16 in FIG. 28 becomes L, which indicates a discharging state, the outputs of two AND circuits 149 and 152 (AND1 and AND2) become both H, both switches 12x and 12y are switched on, and current flows in both batteries, since in an initial condition the outputs D and E of two flip-flops 147 and 155, respectively, are both L. When the output B of the battery current direction detector circuit 86x becomes L, which indicates the charge status of the battery, the output D of the flip-flop 147 becomes H, and the output AND1 of the AND circuit 149 becomes L, and the switch 12x is switched off. Simultaneously, the output of an OR circuit 158 (OR3) becomes H, and the output F of a mono-multi 159 becomes H. Then, since the switch 12x is switched off, the battery current direction detector circuit 86x stops the current direction detection operation, and after a little while the output B of the battery current direction detector circuit 86x becomes H. Then, the output OR3 of the OR circuit 158 becomes L.

When the output F of the mono-multi 159 becomes L, the output G of a flip-flop 160 operating on the falling edge becomes H, the flip-flop 147 is reset through an OR circuit (OR1), and the output D of the flip-flop 147 becomes L. Thus, the output of the AND circuit 149 becomes H, the switch 12x is switched on, and the direction of the battery current is detected again. At this time the output of an OR circuit (OR2) also becomes H.

When the output B of the battery current direction detector circuit 86x becomes L again, which indicates a charging direction, the output D of the flip-flop 147 becomes H again, the output AND1 of the AND circuit 149 becomes L, and the switch 12x is switched off. Then, the output OR3 of the OR circuit 158 becomes H, and the output F of the mono-multi 159 becomes H again.

After a time corresponding to the pulse width of the output F of the mono-multi 159 elapses again, the output G of a flip-flop 160 becomes H in the same way as described earlier, the flip-flop 147 is reset, and the output AND1 of the AND circuit 149 becomes H. For this reason, the switch 12x is switched on, and the current direction is detected for a third time. When it is assumed that the two current direction detector circuits 86x and 86y detect that the currents of both batteries 14x and 14y are in a discharging direction, the flip-flop 147 is not reset, the output AND1 of the AND circuit 149 remains H, and the switch 12x is kept on. After that both batteries 14x and 14y are discharged.

Figure 30:
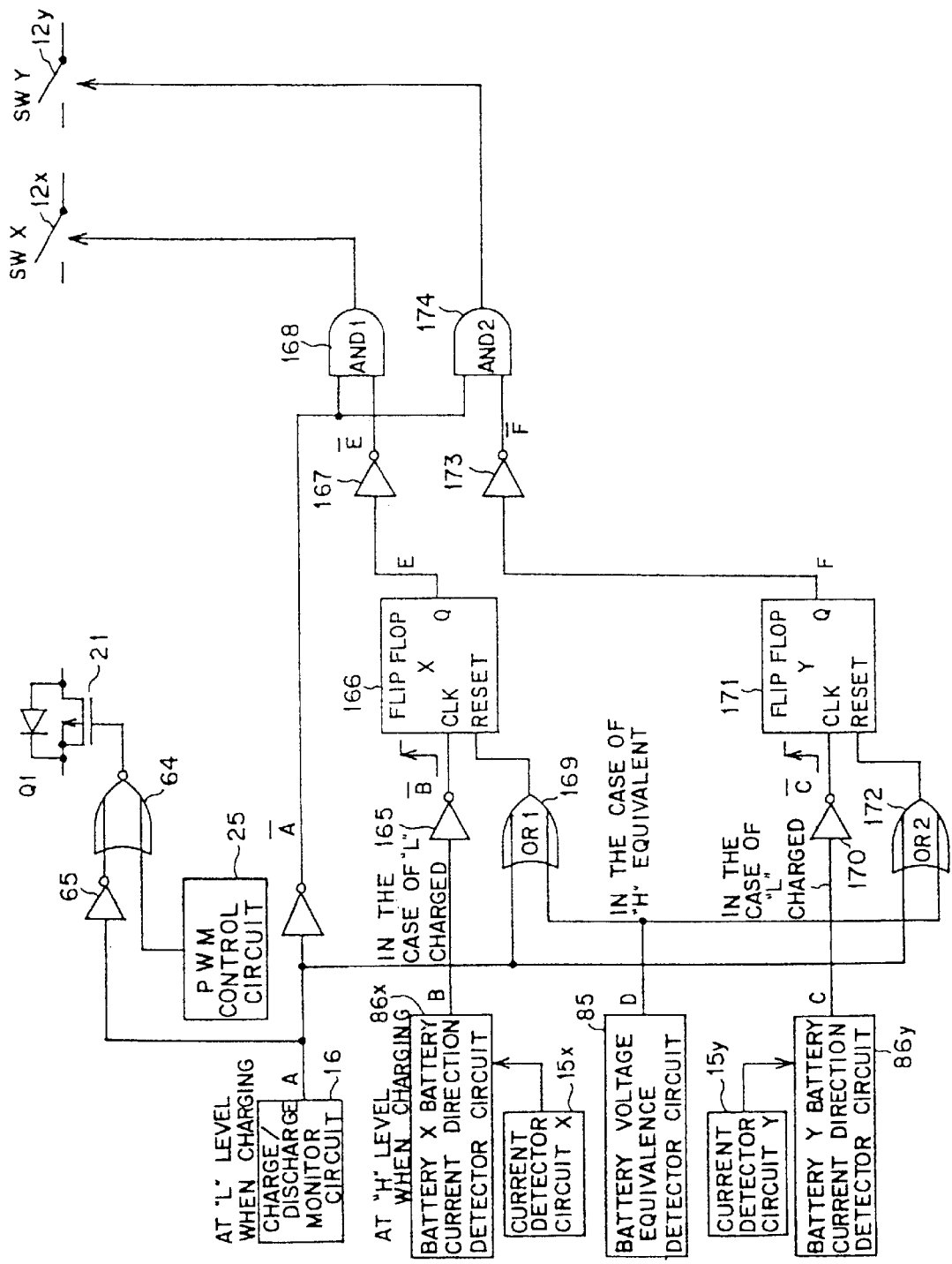
FIG. 30 shows the ninth embodiment of the ON/OFF control circuit of the present invention.

FIG. 30 shows the ninth embodiment of the ON/OFF control circuit of the present invention. In the ninth embodiment, like the eighth embodiment shown in FIG. 28, when the status of the batteries of the power supply apparatus charges to a discharging state, the direction of the battery current is detected, a switch corresponding to one battery whose current flows in a charging direction is switched off, and the other battery is discharged. Then, when it is judged that the voltages of two batteries become equal, the switch which has so far been off is switched on, and both batteries are discharged.

Figure 31:
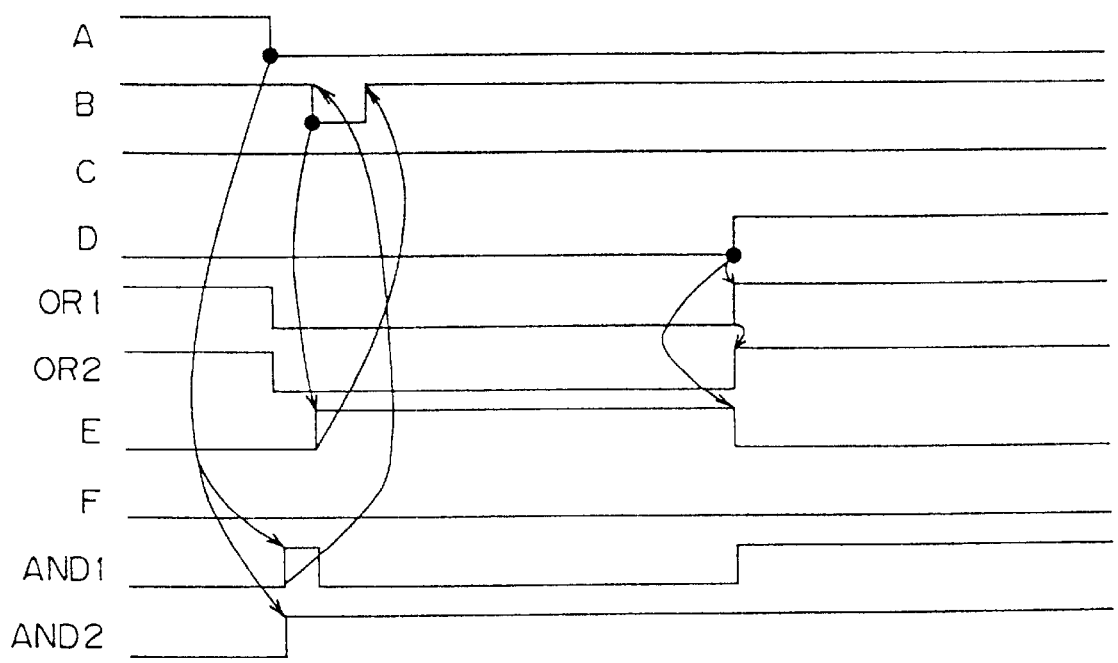
FIG. 31 is a time chart showing the operation of the ninth embodiment.

FIG. 31 is a time chart showing the operation of the ninth embodiment shown in FIG. 30. The timechart shown in FIG. 30 is described for the case where the current direction of the battery 14x is in a charging direction when charging is started.

The output A of the charge/discharge monitor circuit 16 in FIG. 30 becomes L, and as in FIG. 29 the outputs of two AND circuits 168 and 174 (AND1 and AND2) both become H, both switches are switched on, and the current directions are detected. At this moment, the outputs of two OR circuits 169 and 172 (OR1 and OR2) become both L, since the output A of the charge/discharge monitor circuit 16 which was H becomes L.

When the output B of the current direction detector circuit 86x becomes L, as described earlier, the output E of a flip-flop 166 becomes H, the output AND1 of the AND circuit 168 becomes L, and the switch 12x is switched off. Then, when the output D of the battery voltage equivalence detector circuit 85 becomes H, which indicates that the voltages of both batteries are equal, the outputs of the two OR circuits 169 and 172 both become H, the flip-flop 166 is reset, and the output E of the flip-flop 166 becomes L. For this reason, the output AND1 of the AND circuit 168 becomes H, the switch 12x is switched on, and after that both batteries are discharged.

Figure 32:
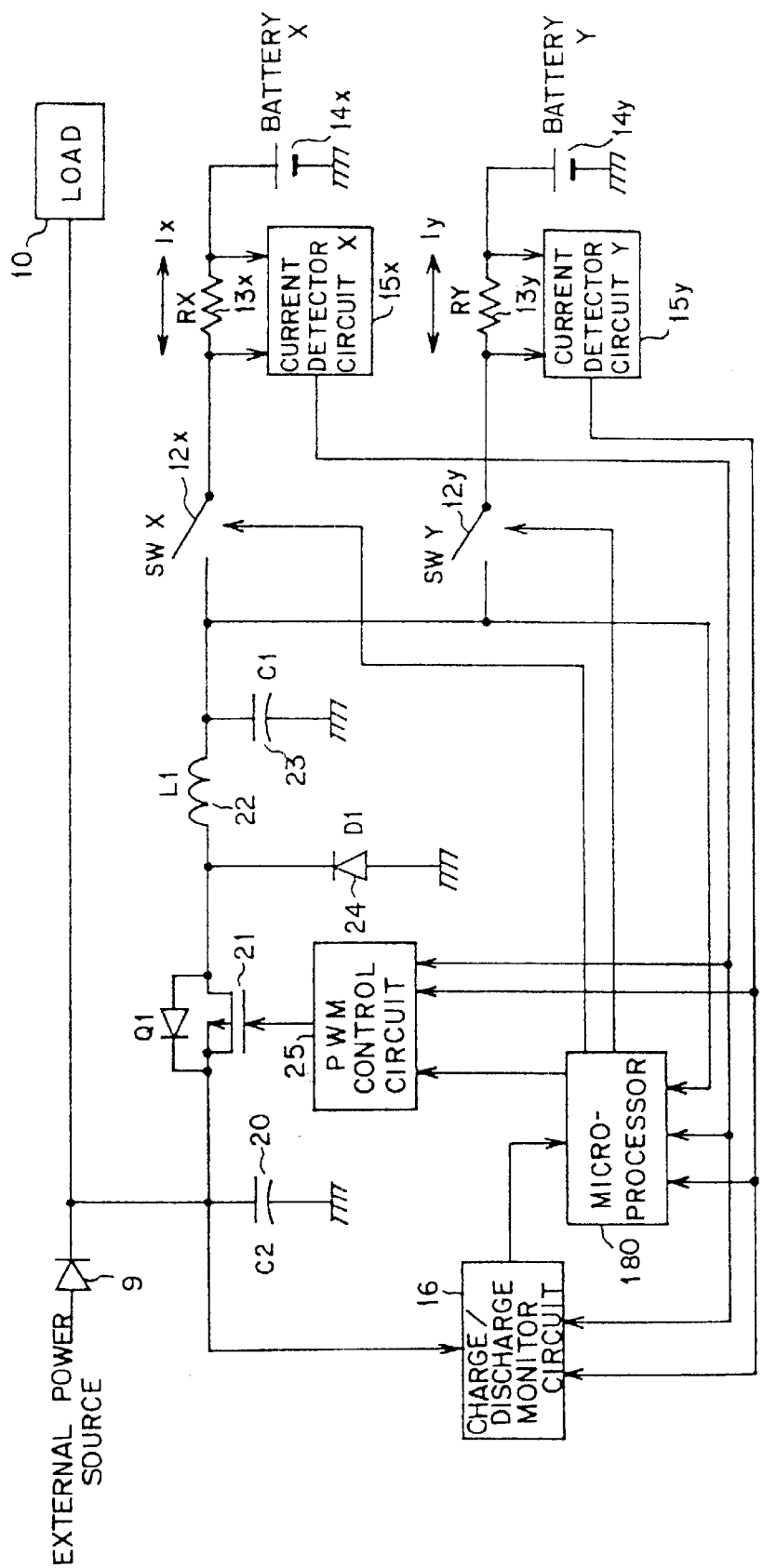
FIG. 32 shows a configuration example of a power supply apparatus in the case where an ON/OFF control circuit is composed by a microprocessor.

Although the hardware configurations of the variety of embodiments of the ON/OFF control circuit of the present invention have been so far described in detail, this ON/OFF control circuit can also be configured using a microprocessor, and thereby the on/off operation of both switches can also be controlled by way of software. FIG. 32 shows a configuration example of such a power supply apparatus. In FIG. 32 a microprocessor 180 is used instead of the ON/OFF control circuit 17 shown in FIG. 3. The on/off control of two switches in this power supply apparatus is described below with reference to FIGS. 33 through 41.

Figure 33:
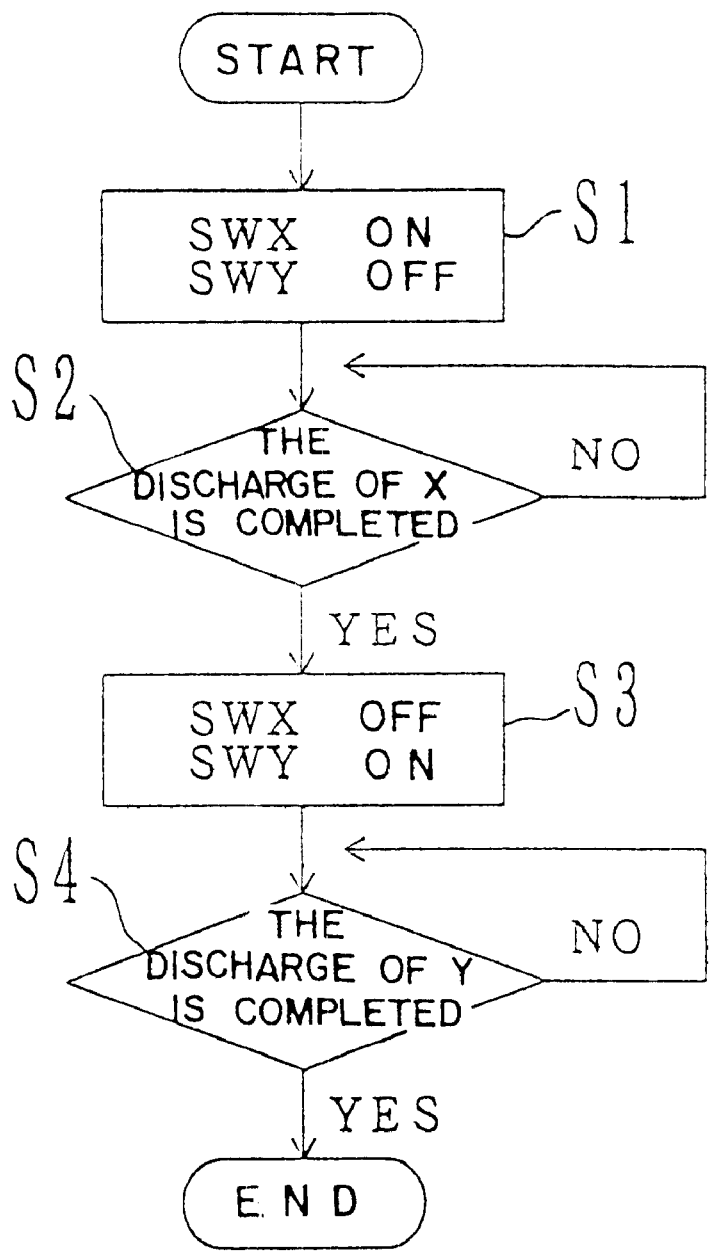
FIG. 33 is a flowchart showing a process corresponding to the ON/OFF control circuit of the first embodiment.

FIG. 33 is a flowchart showing a process corresponding to the ON/OFF control circuit of the first embodiment shown in FIG. 14. When the process is started as shown in FIG. 33, first in step S1 the switches 12x and 12y are switched on and off, respectively, and the battery 14x is charged. In step S2 it is judged whether or not the charging of the battery 14x is completed. If the charge is completed, in step S3, contrary to the above, the switches 12x and 12y are switched off and on, respectively, in steps S4 it is judged whether or not the charging of the battery 14y is completed, and if the charging is completed, the process is terminated.

Figure 34:
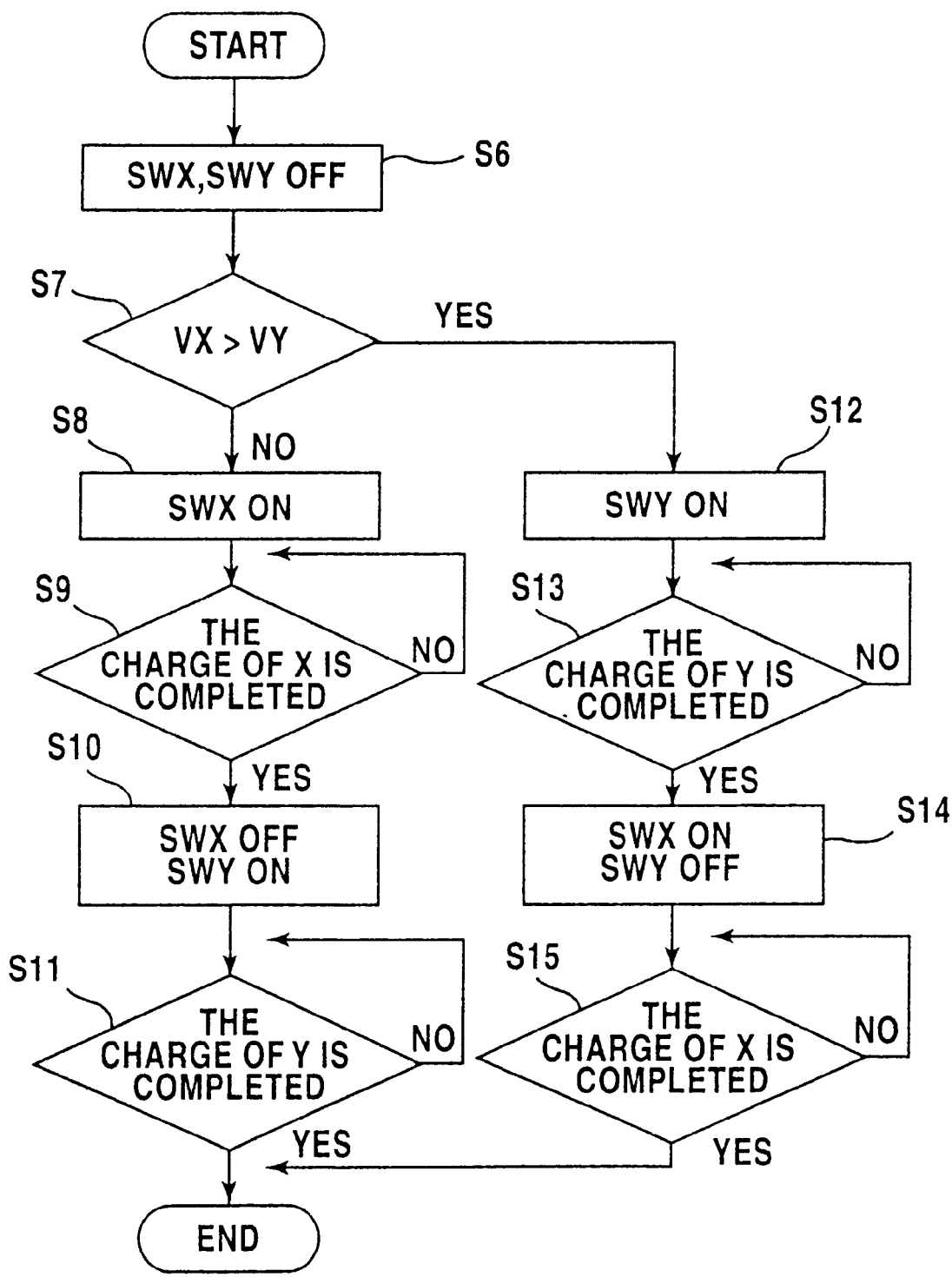
FIG. 34 is a flowchart showing a process corresponding to the ON/OFF control circuit of the second embodiment.

FIG. 34 is a flowchart showing a process corresponding to the ON/OFF control circuit of the second embodiment in FIG. 16. When the process is started as shown in FIG. 34, first, in step S6 both switches 14x and 14y are switched off. In step S7 the voltages of both batteries are compared, and it is judged whether or not the voltage Vx of the battery 14x is higher than the voltage Vy of the battery 14y. If the voltage Vx is not higher than the voltage Vy, in steps S8 through S11, as shown in FIG. 33, both batteries, first 14x and then 14y are charged.

If in step S7 the voltage Vx of the battery 14x is higher than the voltage Vy of the battery 14y, in steps S12 through 15 both batteries, first 14y and then 14x, are charged.

Figure 35:
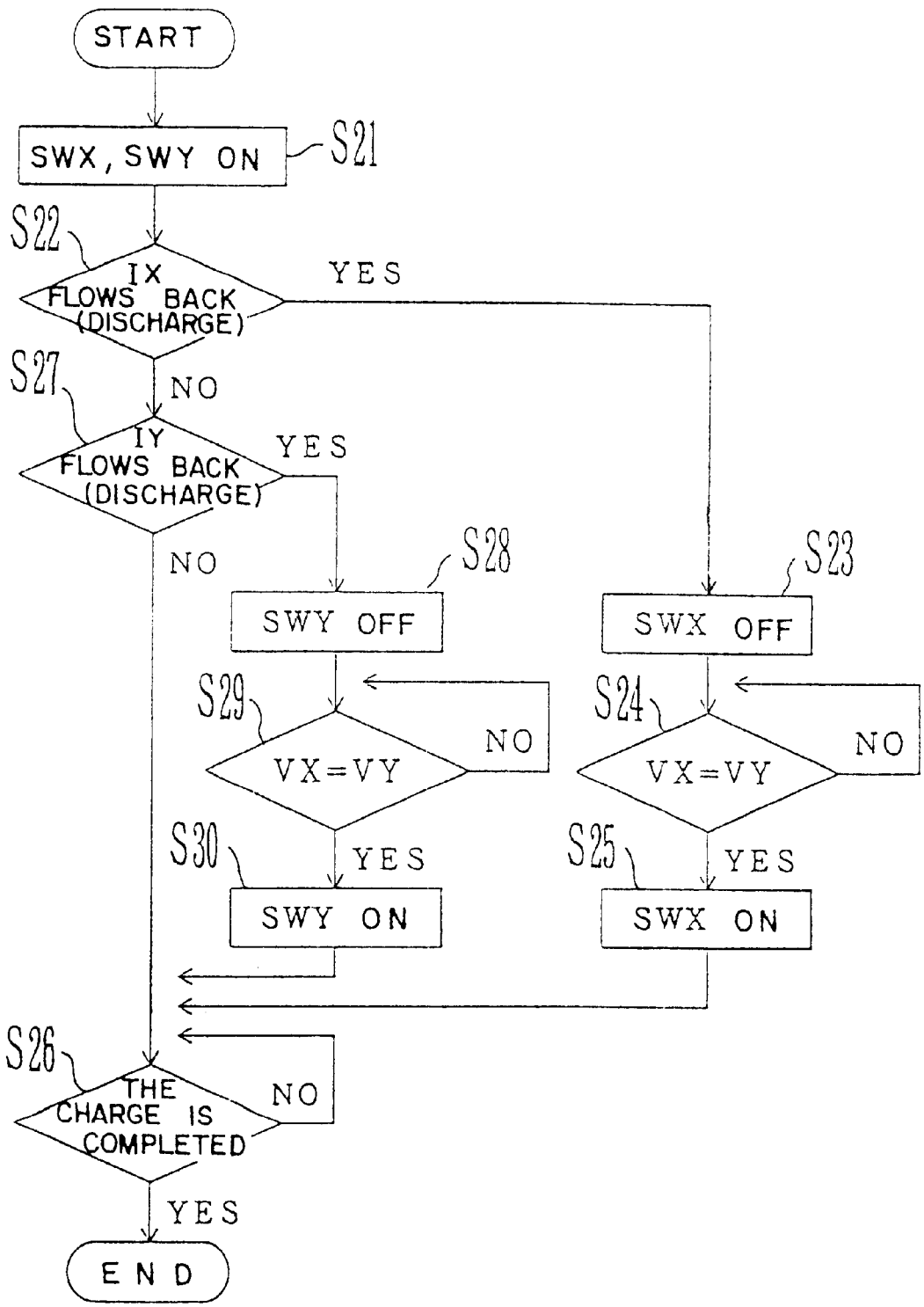
FIG. 35 is a flowchart showing a process corresponding to the ON/OFF control circuit of the third embodiment.

FIG. 35 is a flowchart showing a process corresponding to the ON/OFF control circuit of the third embodiment shown in FIG. 18. When the process is started as shown in FIG. 35, first, in step S21 both switches 12x and 12y are switched on. In step S22, if as a result of detecting the current directions of both batteries it is judged that the current Ix of the battery 14x is in a discharging direction, in step S23 the switch 12x is switched off and the battery 14y is charged. When in step S24 it is judged that the voltages of both batteries are equal, in step S25 the switch 12x is switched on and the battery 14x is charged. Then, in step S26, when it is judged that the charging of both batteries is completed, the process is terminated.

When in step S22 it is judged that the current direction of the battery 14x is not in a discharging direction, in step S27 it is judged whether or not the current Iy of the battery 14y is in a discharging direction. If the current Iy is in a discharging direction, in steps S28 through 30 the battery 14x is charged until the voltages of both batteries become equal. After the voltages of both batteries become equal, both batteries are charged, and the process flow moves to the process in step S26. If in step S27 it is judged that the current of the battery 14y is not in a discharging direction, both batteries are charged until in step S26 it is judged that the charging of both batteries is completed.

Figure 36:
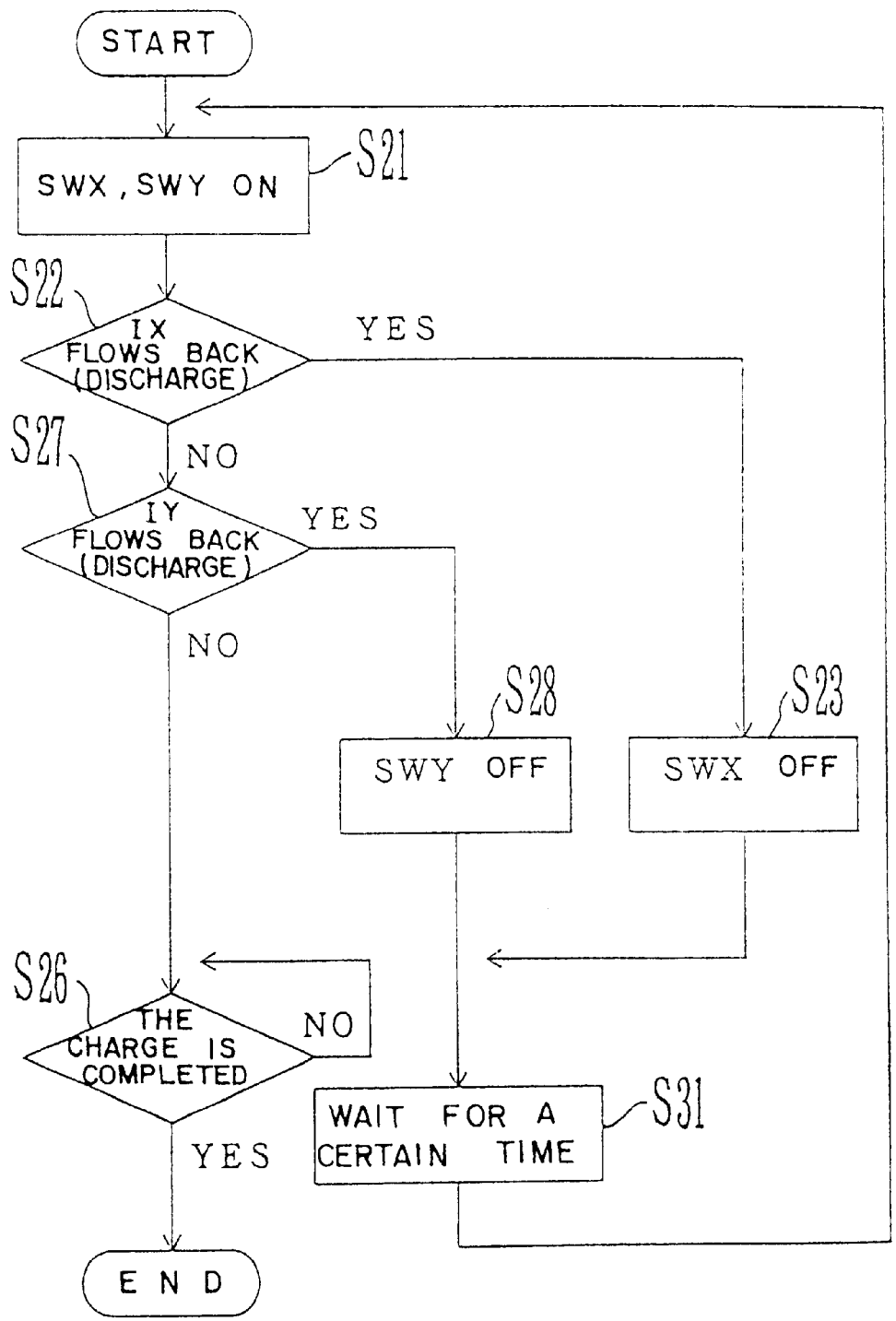
FIG. 36 is a flowchart showing a process corresponding to the ON/OFF control circuit of the fourth embodiment.

FIG. 36 is a flowchart showing a process corresponding to the ON/OFF control circuit of the fourth embodiment shown in FIG. 20. In FIG. 36 the processes similar to those in FIG. 35 are executed. That is, if in step S22 it is judged that the current flow of the battery 14x is in a discharging direction, in step S23 the switch 12x is switched off, and then in step S31 the state is left as it is for a certain time corresponding to the pulse width of the mono-stable multi-vibrator 95 shown in FIG. 20. Then, the process flow returns to step S21, where both switches are switched on, and the processes of the detection of the battery current direction and after are executed.

When in step S27 it is judged that the current direction of the battery 14y is in a discharging direction, in step S28 the switch 12y is switched off, and then the processes in step S31 and after are executed. If in step S27 it is judged that the current direction of the battery 14y is not in a discharging direction, in step S26 the judgement process is repeated until the charging of both batteries is completed.

FIG. 37 is a flowchart showing a process corresponding to the ON/OFF control circuit of the fifth embodiment shown in FIG. 22. In FIG. 37, different charge controls are employed depending on whether the charging of the battery is controlled in a constant voltage mode or in a constant current mode. When the process is started, first, in step S32 it is judged whether or not charging is performed in a constant voltage mode. If the charging is performed in a constant voltage mode, in steps S33 through S36, as shown in steps S21 through S24 in FIG. 35, as a result of the current direction detection of the batteries it is judged that the current flow of the battery 14x is in a discharging direction, the switch 12x is switched off, and only the battery 14y is charged until the voltages of both batteries become equal. If it is judged that the voltages of both batteries are equal, in step S37 the switch 12x is also switched on, and if in step S38 it is judged that the charging of both batteries is completed, the process is terminated.

If in step S34 it is judged that the current direction of the battery 14x is not a discharging direction, in steps S39 through S41 the same processes as in steps S27 through S29 in FIG. 35 are executed, and then the process flow moves to the process of step S37. If in step S39 it is judged that the current direction of the battery 14y is not a discharging direction, the flow immediately moves to the process of step S38.

Next, if in step S32 it is judged that the charging is not performed in a constant voltage mode, first, in step S42 both switches 12x and 12y are switched off, and in step S43 the voltages of both batteries are compared. If the voltage of the battery 14x is higher than the voltage of the battery 14y, of steps S44 and S45 the battery 14y is charged until the voltages of both batteries become equal, and then the flow moves to the process of step S37. If the voltage of the battery 14y is higher than the voltage of the battery 14x, in steps S46 and S47 the battery 14x is charged until the voltages of both batteries become equal, and then the flow moves to the process of step S37.

Figure 38:
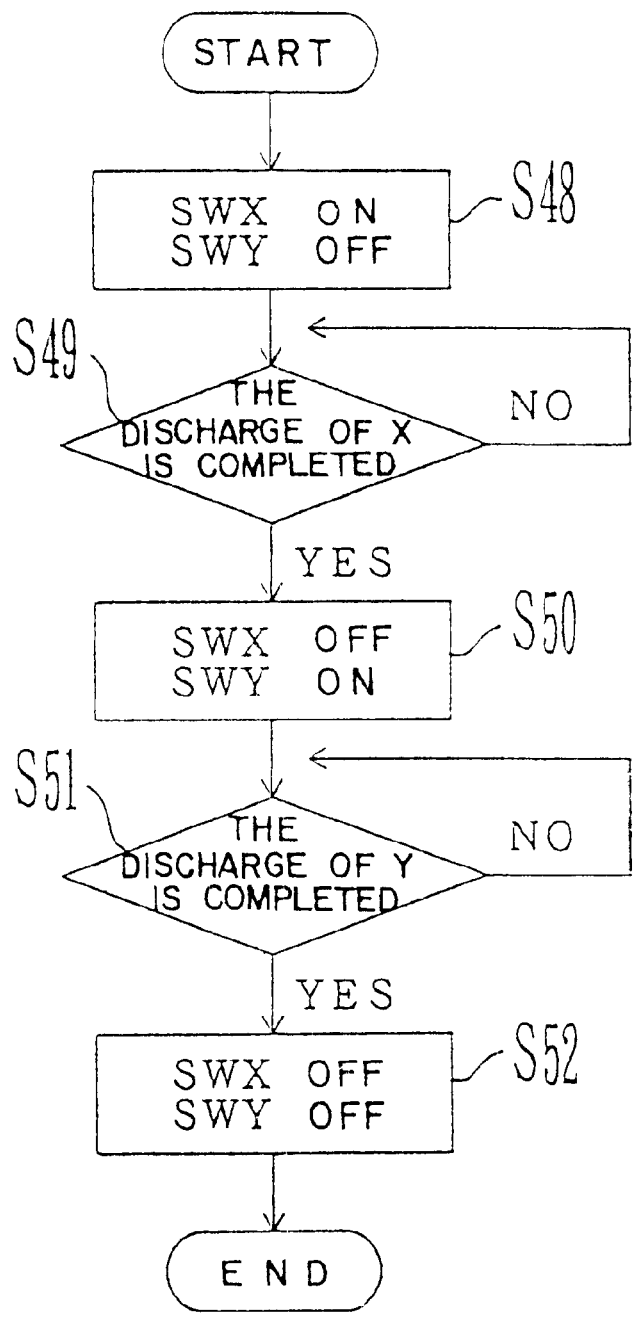
FIG. 38 is a flowchart showing a process corresponding to the ON/OFF control circuit of the sixth embodiment.

FIG. 38 is a flowchart showing a process corresponding to the ON/OFF control circuit of the sixth embodiment shown in FIG. 24. In FIG. 38, first, the battery 14x is discharged, and after discharging is completed, the battery 14y is discharged. The process is basically the same as that for charging as shown in FIG. 33, except that lastly in step S52 both switches are switched off.

Figure 39:
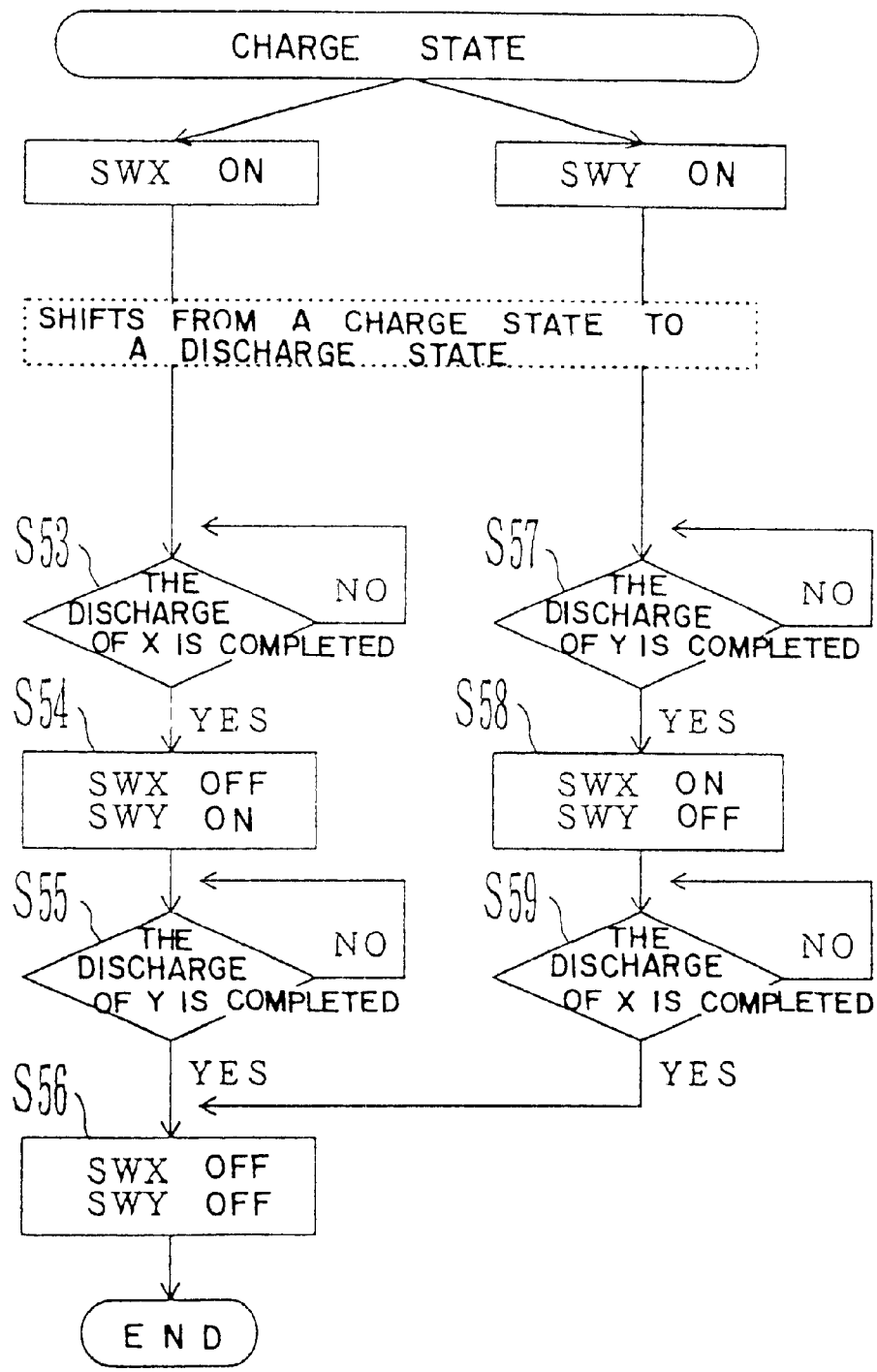
FIG. 39 is a flowchart showing a process corresponding to the ON/OFF control circuit of the seventh embodiment.

FIG. 39 is a flowchart showing a process corresponding to the ON/OFF control circuit of the seventh embodiment shown in FIG. 26. In FIG. 39, different control is performed depending on which switch is on in the charging state of a battery. If a battery status charges to a discharging state in a condition where the switch 12x has been on in a charging state, in steps S53 through S56 the discharging is controlled in the same way as shown in FIG. 38.

On the other hand, if a battery status charges to a discharging state in a condition where the switch 12y has been on in a charging state, in steps S57 through S59 the batteries, first, 14y and then 14x, are discharged until the discharging of both batteries 14y and 14x is completed, and then in step S56 both switches are switched off.

Figure 40:
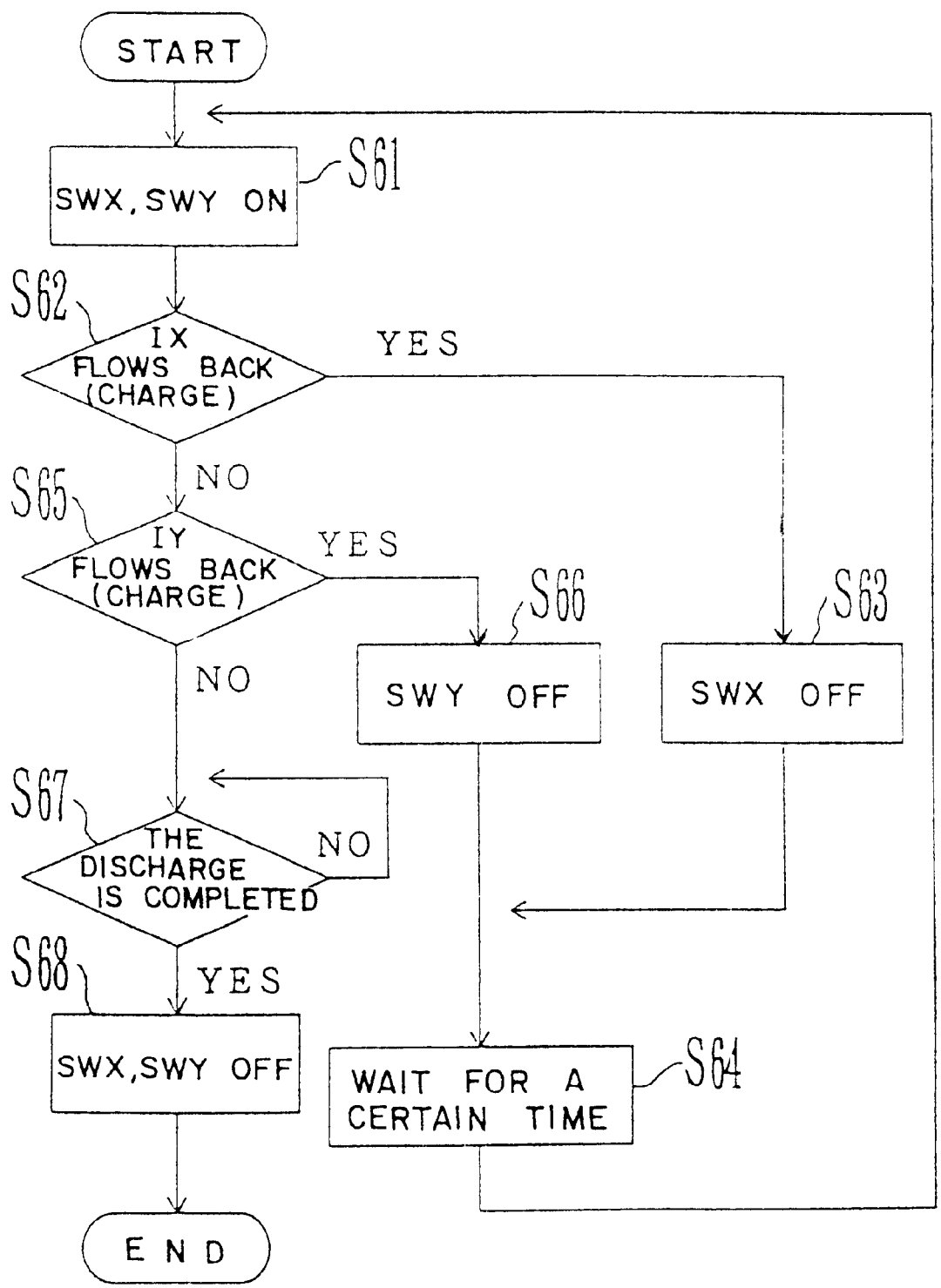
FIG. 40 is a flowchart showing a process corresponding to the ON/OFF control circuit of the eighth embodiment.

FIG. 40 is a flowchart showing a process corresponding to the ON/OFF control circuit of the eighth embodiment shown in FIG. 28. In FIG. 40, the same on/off control of the switches as in the charge control shown in FIG. 36 is performed, and the discharging is performed. That is, as a result of the detection of the battery current direction, a switch corresponding to the battery in which the current direction is the reverse of a target discharging is switched off, and discharging is performed. Then, the current direction is detected for each a certain time, and the control is maintained. Then, if in step S67 it is judged that the discharging of both batteries is completed, in step S68 both switches are switched off and the process is terminated.

Figure 41:
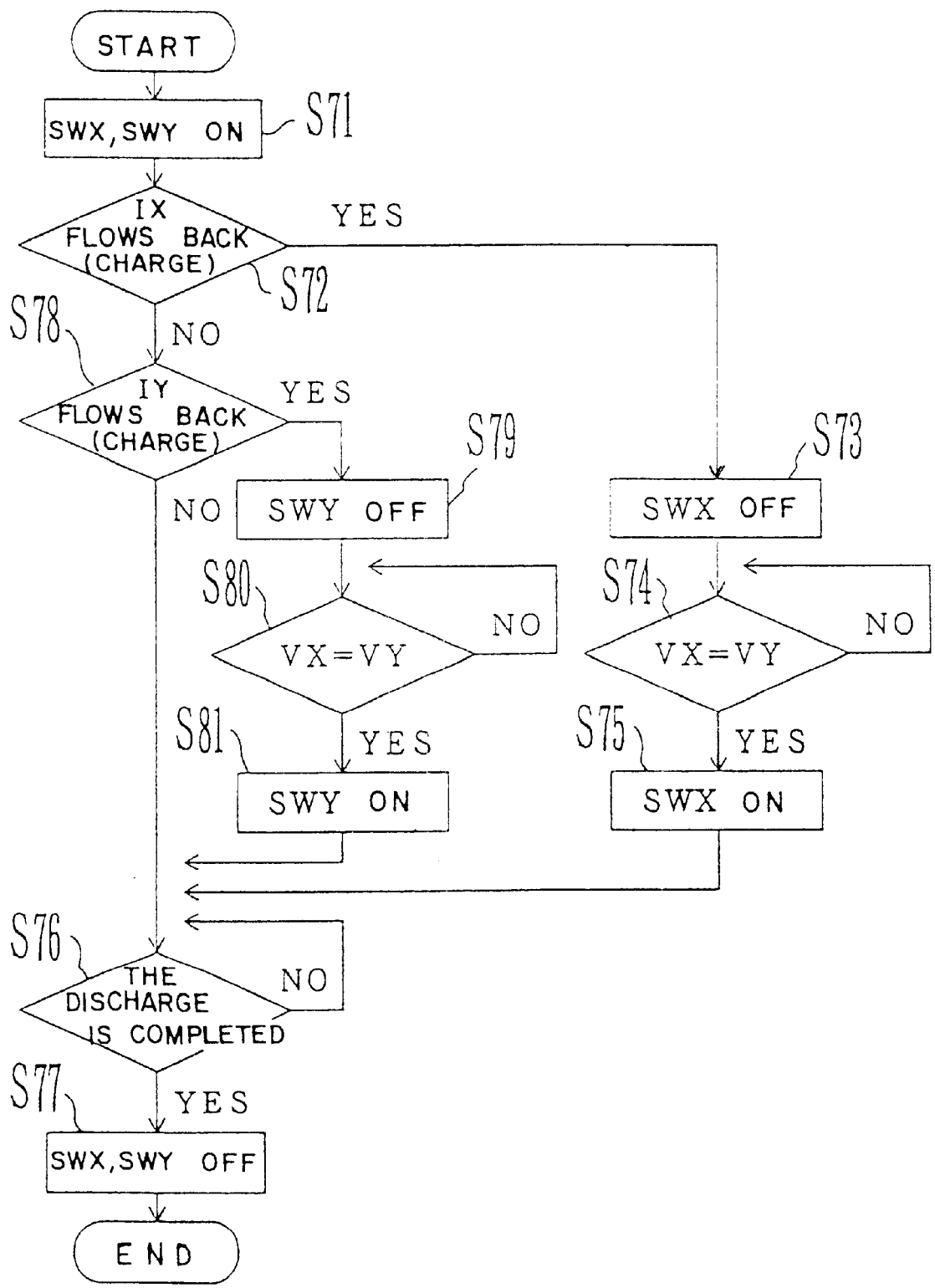
FIG. 41 is a flowchart showing a process corresponding to the ON/OFF control circuit of the ninth embodiment.

FIG. 41 is a flowchart showing a process corresponding to the ON/OFF control circuit of the ninth embodiment shown in FIG. 30. In FIG. 41, the same on/off control of the switches as that for charging as shown in FIG. 35 is performed as a discharging control. That is, the detections of the current directions of both batteries are performed, a switch corresponding to the battery whose current flow is in a charging direction is switched off, and the other battery is discharged. After the voltages of both batteries become equal, the former battery is also discharged. When in step S76 it is judged that the discharging of both batteries is completed, in step S77 both switches are switched off, and the process is terminated.

Although the ON/OFF control circuits of the embodiments have been so far described roughly classifying into when discharging and when charging, it is natural that the charging embodiments and the discharging embodiments can be used properly combined in an actual power supply apparatus.

Furthermore, although the embodiments of the present invention are described above for the case where two chargeable batteries are connected in parallel, the number of the batteries is not limited to two, and the on/off control method of the present invention can be basically applied to the case of three or more batteries.

As so far described in detail, according to the present invention, by connecting a plurality of batteries and controlling switches for switching on/off the charging/discharging current flowing in each battery, a current can be prevented from flowing from charged batteries to less-charged batteries, if there is some imbalance between the charging states of the batteries, the charging energy of the batteries can be effectively used, and the performance of a power supply apparatus can be greatly improved.

What is claimed is:

1. A power supply apparatus in which a plurality of chargeable batteries are connected in parallel between the node of an external power source and a load, and the common ground of the external power source and the load, comprising:

charge/discharge monitor which judges whether the external power source is in a charging state when the load is driven and a sufficient voltage for charging the batteries is outputted, or in a discharging state when a sufficient voltage is not outputted and a discharging current should be supplied from the chargeable batteries to the load;

switch connected in series to each of the plurality of batteries; and on/off controller which controls the on/off operation of the switches according to the output of the charge/discharge monitor and the charging/discharging state of each of the plurality of batteries, further comprising:

voltage equivalence detector which detects the equivalence of the voltages between said plurality of batteries;

current detector which detects a current flowing in each of said plurality of batteries; and battery current direction judging unit which judges from the output of the current detector whether a current flowing in each of said plurality of batteries is in a charging direction or in a discharging direction, wherein when said charge/discharge monitor judges that said external power source is in a charging state, said on/off controller which performs a control of switching off said switches corresponding to the batteries of which the current flows in a discharging direction and charging only the batteries of which the current flows in a charging direction, and then, every time a voltage equivalence is detected between batteries corresponding to the switched-off switches and the batteries during charging by the voltage equivalence detector, said on/off controller performs a control of switching on the switched-off switches corresponding to the batteries of which the voltage equivalence is detected by the voltage equivalence detector.

2. A power supply apparatus in which a plurality of chargeable batteries are connected in parallel between the node of an external power source and a load, and the common ground of the external power source and the load, comprising:

charge/discharge monitor which judges whether the external power source is in a charging state when the load is driven and a sufficient voltage for charging the batteries is outputted, or in a discharging state when a sufficient voltage is not outputted and a discharging current should be supplied from the chargeable batteries to the load;

switch connected in series to each of the plurality of batteries; and on/off controller which controls the on/off operation of the switches according to the output of the charge/discharge monitor and the charging/discharging state of each of the plurality of batteries, further comprising:

current detector which detects a current flowing in each of said plurality of batteries; and battery current direction judging unit which judges from the output of the current detector whether the current flowing in each of said plurality of batteries is in a charging direction or in a discharging direction, wherein when said charge/discharge monitor judges that said external power source is in a charging state, said on/off controller which performs a first control of switching off said switches corresponding to the batteries in which the current is judged to flow in a discharging direction at that moment by the battery current direction judging unit and charging only the batteries in which the current is judged to flow in a charging direction, and then, every time a predetermined charge time of the batteries elapses, said on/off controller repeats the first control process.

3. A power supply apparatus in which a plurality of chargeable batteries are connected in parallel between the node of an external power source and a load, and the common ground of the external power source and the load, comprising:

charge/discharge monitor which judges whether the external power source is in a charging state when the load is driven and a sufficient voltage for charging the batteries is outputted, or in a discharging state when a sufficient voltage is not outputted and a discharging current should be supplied from the chargeable batteries to the load;

switch means connected in series to each of the plurality of batteries; and on/off controller which controlls the on/off operation of the switches according to the output of the charge/discharge monitor and the charging/discharging state of each of the plurality of batteries, further comprising:

a direct current-direct current (DC—DC) converter, provided between the node of said external power source and said load, and the parallel node of said plurality of batteries, and controlled by pulse width modulation (PWM) when charging said plurality of batteries, for composing a direct discharging route from said plurality of batteries to said load when said plurality of batteries discharge current to said load;

constant voltage/constant current judging unit which judges whether the DC—DC converter is constant-voltage-controlled so that the output voltage may become constant, or constant-current-controlled so that the output current may become constant;

voltage comparator which compares the voltages of said plurality of batteries;

voltage equivalence detectir which detects the equivalence of the voltages between said plurality of batteries;

current detector which detects the current flowing in each of said plurality of batteries; and battery current direction judging unit which judges from the output of the current detector whether the current flowing in each of said plurality of batteries is in a charging direction or in a discharging direction, wherein when said charge/discharge monitor which judges that said external power source is in a charging state, if the constant voltage/constant current judging unit judges that the DC—DC converter is constant-voltage-controlled, said on/off controllor performs a control of switching off said switches corresponding to the batteries in which the current is judged to flow in a discharging direction by the battery current direction judging unit and charging only the batteries in which the current is judged to flow in a charging direction, and then, every time a voltage equivalence is detected between the batteries corresponding to the switched-off switches and the batteries during charging by the voltage equivalence detector, said on/off controller performs a control of switching on the switched-off switches corresponding to the batteries of which the voltage equivalence is detected by the voltage equivalence detector, and if the constant voltage/constant current judging means judges that the DC—DC converter is constant-current-controlled, said on/off controllor performs a control of switching on only said switches corresponding to the batteries with voltages judged to be the lowest by the voltage comparator, and then, every time a voltage equivalence is detected between the batteries during charge and the other batteries by the voltage equivalence detector, said on/off controller performs a control of switching on the switched-off switches corresponding to the batteries of which the voltage equivalence is detected by the voltage equivalence detector.

4. A power supply apparatus in which a plurality of chargeable batteries are connected in parallel between the node of an external power source and a load, and the common ground of the external power source and the load, comprising:

charge/discharge monitor which judges whether the external power source is in a charging state when the load is driven and a sufficient voltage for charging the batteries is outputted, or in a discharging state when a sufficient voltage is not outputted and a discharging current should be supplied from the chargeable batteries to the load;

switch connected in series to each of the plurality of batteries; and on/off controller which controls the on/off operation of the switches according to the output of the charge/discharge monitor and the charging/discharging state of each of the plurality of batteries, further comprising;

a direct current-direct current (DC—DC) converter, provided between the node of said external power source and said load, and the parallel node of said plurality of batteries, and controlled by pulse width modulation (PWM) when charging said plurality of batteries, for composing a direct discharging route from said plurality of batteries to said load when said plurality of batteries discharge current to said load;

constant voltage/constant current judging unit which judges whether the DC—DC converter is constant-voltage-controlled so that the output voltage may become constant, or constant-current-controlled so that the output current may become constant;

voltage comparator which compares the voltages of said plurality of batteries;

voltage equivalence detector which detects the equivalence of the voltages between said plurality of batteries;

current detector which detects the current flowing in each of said plurality of batteries; and battery current direction judging unit judging from the output of the current detector whether the current flowing in each of said plurality of batteries is in a charging direction or in a discharging direction, wherein when said charge/discharge monitor judges that said external power source is in a charging state, if the constant voltage/constant current judging unit judges that the DC—DC converter is constant-voltage-controlled, said on/off controllor performs a control of switching off said switches corresponding to the batteries in which the current is judged to flow in a discharging direction by the battery current direction judging unit and charging only the batteries in which the current is judged to flow in a charging direction, and then, every time a voltage equivalence is detected between the batteries corresponding to the switched-off switches and the batteries during charging by the voltage equivalence detector, said on/off controller performs a control of switching on the switched-off switches corresponding to the batteries of which the voltage equivalence is detected by the voltage equivalence detector, and if the constant voltage/constant current judging unit judges that the DC—DC converter is constant-current-controlled, said on/off controller means performs a control of switching on only said switches corresponding to the batteries with voltages judged to be the lowest by the voltage comparator, and then, every time a voltage equivalence is detected between the batteries during charge and the other batteries by the voltage equivalence detector, said on/off controller performs a control of switching on the switched-off switches corresponding to the batteries of which the voltage equivalence is detected by the voltage equivalence detector, wherein said DC—DC converter comprises:

a voltage error amplifier which outputs a signal to constant-voltage-control said DC—DC converter;

a current error amplifier which outputs a signal to constant-current-control said DC—DC converter, wherein said constant voltage/constant current judging unit comprises comparator which compares the output of the voltage error amplifier and the output of the current error amplifier.

5. A power supply apparatus in which a plurality of chargeable batteries are connected in parallel between the node of an external power source and a load, and the common ground of the external power source and the load, comprising:

charge/discharge monitor which judges whether the external power source is in a charging state when the load is driven and a sufficient voltage for charging the batteries is outputted, or in a discharging state when a sufficient voltage is not outputted and a discharging current should be supplied from the chargeable batteries to the load;

switch connected in series to each of the plurality of batteries; and on/off controller which controls the on/off operation of the switches according to the output of the charge/discharge monitor and the charging/discharging state of each of the plurality of batteries, further comprising;

a direct current-direct current (DC—DC) converter, provided between the node of said external power source and said load, and the parallel node of said plurality of batteries, and controlled by pulse width modulation (PWM) when charging said plurality of batteries, for composing a direct discharging route from said plurality of batteries to said load when said plurality of batteries discharge current to said load;

constant voltage/constant current judging unit which judges whether the DC—DC converter is constant-voltage-controlled so that the output voltage may become constant, or constant-current-controlled so that the output current may become constant;

voltage comparator which compares the voltages of said plurality of batteries;

voltage equivalence detector which detects the equivalence of the voltages between said plurality of batteries;

current detector which detects the current flowing in each of said plurality of batteries; and battery current direction judging unit which judges from the output of the current detector whether the current flowing in each of said plurality of batteries is in a charging direction or in a discharging direction, wherein when said charge/discharge monitor judges that said external power source is in a charging state, if the constant voltage/constant current judging unit judges that the DC—DC converter is constant-voltage-controlled, said on/off controller performs a control of switching off said switches corresponding to the batteries in which the current is judged to flow in a discharging direction by the battery current direction judging unit and charging only the batteries in which the current is judged to flow in a charging direction, and then, every time a voltage equivalence is detected between the batteries corresponding to the switched-off switches and the batteries during charging by the voltage equivalence detector, said on/off controller performs a control of switching on the switched-off switches corresponding to the batteries of which the voltage equivalence is detected by the voltage equivalence detector, and if the constant voltage/constant current judging means judges that the DC—DC converter is constant-current-controlled, said on/off controller performs a control of switching on only said switches corresponding to the batteries with voltages judged to be the lowest by the voltage comparator, and then, every time a voltage equivalence is detected between the batteries during charge and the other batteries by the voltage equivalence detector, said on/off controller performs a control of switching on the switched-off switches corresponding to the batteries of which the voltage equivalence is detected by the voltage equivalence detector, wherein said constant voltage/constant current judging unit comprises voltage comparator which compares the output voltage of said DC—DC converter and a predetermined reference voltage.

6. A power supply apparatus in which a plurality of chargeable batteries are connected in parallel between the node of an external power source and a load, and the common ground of the external power source and the load, comprising:

charge/discharge monitor which judges whether the external power source is in a charging state when the load is driven and a sufficient voltage for charging the batteries is outputted, or in a discharging state when a sufficient voltage is not outputted and a discharging current should be supplied from the chargeable batteries to the load;

switch connected in series to each of the plurality of batteries; and on/off controller which controls the on/off operation of the switches according to the output of the charge/discharge monitor and the charging/discharging state of each of the plurality of batteries, further comprising discharge completion detector which dectects a state where each of said plurality of batteries completes discharging, wherein when said charge/discharge monitor judges that said external power source is in a discharging state, said on/off controller performs a first control of switching on only said switch corresponding to one battery out of said plurality of batteries, then, when the discharge completion detector detects the discharge of one battery, said on/off controller performs a second control of switching off the switched-on switch and a third control of switching on only said switch corresponding to one battery out of the remaining batteries in which the discharging completion is not detected by the discharge completion detector, and then, every time the discharging completion of one battery is detected by the discharge completion detector, said on/off controller repeats the second and third control process.

7. A power supply apparatus in which a plurality of chargeable batteries are connected in parallel between the node of an external power source and a load, and the common ground of the external power source and the load, comprising:

charge/discharge monitor which judges whether the external power source is in a charging state when the load is driven and a sufficient voltage for charging the batteries is outputted, or in a discharging state when a sufficient voltage is not outputted and a discharging current should be supplied from the chargeable batteries to the load;

switch connected in series to each of the plurality of batteries; and on/off controller which controls the on/off operation of the switches according to the output of the charge/discharge monitor and the charging/discharging state of each of the plurality of batteries, further comprising discharge completion detector which detects a state where each of said plurality of batteries completes discharging, wherein when said charge/discharge monitor detects that a status of said external power source charges from a charging state to a discharging state, said on/off controller maintains the on/off operation of said switch in the charging state, then, every time the discharging completion detector detects the discharging completion of any of the batteries in which the corresponding switch is switched on, said on/off controller performs a control of switching off switches corresponding to the batteries in which discharging completion is detected by the discharge completion detector, then, when the discharging completion of batteries corresponding to all the switches switched on in the charge state is detected by the discharge completion detector, said on/off controller performs a control of switching on the switches switched off in the charging state.

8. A power supply apparatus in which a plurality of chargeable batteries are connected in parallel between the node of an external power source and a load, and the common ground of the external power source and the load, comprising:

charge/discharge monitor which judges whether the external power source is in a charging state when the load is driven and a sufficient voltage for charging the batteries is outputted, or in a discharging state when a sufficient voltage is not outputted and a discharging current should be supplied from the chargeable batteries to the load;

switch connected in series to each of the plurality of batteries; and on/off controller which controls the on/off operation of the switches according to the output of the charge/discharge monitor and the charging/discharging state of each of the plurality of batteries, further comprising:

discharge completion detector which detects a state where each of said plurality of batteries completes discharging;

current detector which detects the current flowing in each of said plurality of batteries; and battery current direction judging unit which judges from the output of the current detector whether the current flowing in each of said plurality of batteries is in a charging direction or in a discharging direction, wherein when said charge/discharge monitor detects that a status of said external power source charges from a charging state to a discharging state, said on/off controller performs a first control of switching off said switches corresponding to the batteries in which the current is judged to flow in a charging direction at that moment by the battery current direction judging unit and discharging only the batteries in which the current is judged to flow in a discharging direction, and then, every time the predetermined discharge times of the batteries elapse, said on/off controller repeats the first control process.

9. A power supply apparatus in which a plurality of chargeable batteries are connected in parallel between the node of an external power source and a load, and the common ground of the external power source and the load, comprising:

charge/discharge monitor which judges whether the external power source is in a charging state when the load is driven and a sufficient voltage for charging the batteries is outputted, or in a discharging state when a sufficient voltage is not outputted and a discharging current should be supplied from the chargeable batteries to the load;

switch connected in series to each of the plurality of batteries; and on/off controller which controls the on/off operation of the switches according to the output of the charge/discharge monitor and the charging/discharging state of each of the plurality of batteries, further comprising:

current detector which detects the current flowing in each of said plurality of batteries;

battery current direction judging unit which judges from the output of the current detector whether the current flowing in each of said plurality of batteries is in a charging direction or in a discharging direction, and voltage equivalence detector which detects the equivalence of the voltages between said plurality of batteries, wherein when said charge/discharge monitor judges that a status of said external power source charges from a charging state to a discharging state, said on/off controller performs a control of switching off said switches corresponding to the batteries in which the current is judged to flow in a charging direction at that moment by the battery current direction judging unit and discharging only the batteries in which the current is judged to flow in a discharging direction, and then, every time a voltage equivalence is detected between the batteries corresponding to the switched-off switches and the batteries during discharge by the voltage equivalence detector, said on/off controller performs a control of switching on the switched-off switches corresponding to the batteries of which the voltage equivalence is detected by the voltage equivalence detector.

10. A method for charging a plurality of batteries in a power supply apparatus with a plurality of chargeable batteries, comprising the steps of:

(a) charging only the batteries out of the plurality of batteries in which the respective current flows in a charge direction when the status of said power supply apparatus indicates a charging state;

(b) detecting batteries of which the voltages become equal to the voltages of the batteries during charging from the plurality of batteries, except for those during charging;

(c) charging the batteries detected in step (b); and (d) repeating step (b) and (c).

11. A method for charging a plurality of batteries in a power supply apparatus with a plurality of chargeable batteries, comprising the steps of:

(a) charging only the batteries out of the plurality of batteries in which the respective current flows in a charging direction when the status of said power supply apparatus indicates a charging state;

(b) when the predetermined charging times of the batteries during charging elapse, detecting the direction of the current flowing in each of the plurality of batteries which have not charged;

(c) charging only the batteries in which the respective current detected in step (b) flows in a charging direction; and (d) repeating steps (b) and (c).

12. A method for charging a plurality of batteries in a power supply apparatus comprising a plurality of chargeable batteries and a direct current-direct current (DC—DC) converter, provided between the node of an external power source and a load, and the parallel mode of the plurality of batteries and controlled by a pulse width modulation (PWM) when charging the plurality of batteries, for composing a direct discharging route from the plurality of batteries to the load when the plurality of batteries discharge current to the load, comprising the steps of:

(a) when charging said plurality of batteries, the DC—DC converter judges whether the converter is constant-voltage-controlled so that the output voltage may become constant, or constant-current controlled so that the output current may become constant;

(b) if is judged in step (a) that the DC—DC converter is constant-voltage-controlled, executing the following steps:

(c) charging only the batteries out the plurality of batteries in which the respective current flows in a charge direction when the status of said power supply apparatus indicates a charging state;

(d) detecting batteries of which the voltages become equal to the voltages of the batteries during charging from the plurality of batteries except for those during charging;

(e) charging the batteries detected in step (d); and (f) repeating steps (d) and (e), and (g) if it judged in step (a) that the DC—DC converter is constant-current-controlled, executing the following steps:

(h) charging a battery with the lowest voltage among the plurality of batteries;

(i) detecting batteries of which the voltages become equal to the voltages of the batteries during charging from the plurality of batteries, except for those during charging;

(j) charging the batteries detected in step (i); and (k) repeating steps (i) and (j).

* * * * *